(12) United States Patent
Deshpande

(10) Patent No.: US 9,913,216 B1
(45) Date of Patent: Mar. 6, 2018

(54) TECHNIQUES TO REDUCE POWER CONSUMPTION IN MOBILE DEVICE DURING LOW-POWER MODE

(71) Applicant: QUALCOMM Incorporated, San Diego, CA (US)

(72) Inventor: Pankaj Arvind Deshpande, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/256,425

(22) Filed: Sep. 2, 2016

(51) Int. Cl.
| | |
|---|---|
| *H04M 1/00* | (2006.01) |
| *H04B 1/38* | (2015.01) |
| *H04W 52/02* | (2009.01) |
| *H04W 4/00* | (2018.01) |
| *H04W 56/00* | (2009.01) |
| *H04W 28/14* | (2009.01) |
| *H04W 28/22* | (2009.01) |
| *H04W 84/12* | (2009.01) |

(52) U.S. Cl.
CPC ....... *H04W 52/0216* (2013.01); *H04W 4/008* (2013.01); *H04W 28/14* (2013.01); *H04W 28/22* (2013.01); *H04W 56/001* (2013.01); *H04W 84/12* (2013.01)

(58) Field of Classification Search
CPC ............ H04W 4/008; H04W 52/0206; H04W 52/0209; H04W 68/005; H04W 84/12; H04W 88/06; H04W 88/08; H04B 1/401; H04M 2250/06
USPC ................ 455/41.1, 41.2, 552.1, 553.1, 574; 370/311
See application file for complete search history.

(56) References Cited

U.S. PATENT DOCUMENTS

| | | | | |
|---|---|---|---|---|
| 7,433,669 | B2 * | 10/2008 | Rue | H04L 12/12 |
| | | | | 455/343.2 |
| 7,733,831 | B2 * | 6/2010 | Samuel | H04W 48/08 |
| | | | | 455/552.1 |

(Continued)

FOREIGN PATENT DOCUMENTS

EP      2755429 A1    7/2014

OTHER PUBLICATIONS

ISA/EP, International Search Report and Written Opinion of the International Searching Authority, Int'l Application No. PCT/US2017/047660, dated Nov. 7, 2017, European Patent Office, Rijswijk, NL, 18 pgs.

(Continued)

*Primary Examiner* — Quochien B Vuong
(74) *Attorney, Agent, or Firm* — Holland & Hart LLP

(57) ABSTRACT

Methods, systems, and devices for wireless communication are described. Techniques for communicating between an access point and a mobile device via a low-power radio access technology different than a normal radio access technology used for communication are described. During a first negotiation, it is determined whether the access point and the mobile device are capable of communicating via the low-power radio access technology. During a second negotiation, communication parameters for using the low-power radio access technology are agreed upon between the access point and the mobile device. Communications via the low-power radio access technology may be made while the mobile device is in a low-power mode.

26 Claims, 20 Drawing Sheets

(56) References Cited

U.S. PATENT DOCUMENTS

| | | | |
|---|---|---|---|
| 8,391,918 B2* | 3/2013 | Ekici | H04W 48/18 |
| | | | 455/574 |
| 8,442,475 B2* | 5/2013 | Antonio | H04W 52/0232 |
| | | | 455/343.1 |
| 8,467,326 B2 | 6/2013 | Deprun | |
| 9,538,468 B2* | 1/2017 | Radhakrishnan | H04W 52/0209 |
| 2011/0212746 A1 | 9/2011 | Sarkar et al. | |
| 2014/0153469 A1* | 6/2014 | Park | H04W 52/0216 |
| | | | 370/311 |
| 2015/0382304 A1 | 12/2015 | Park | |
| 2016/0095061 A1 | 3/2016 | Vainapel et al. | |
| 2016/0112951 A1 | 4/2016 | Batra et al. | |
| 2016/0127996 A1 | 5/2016 | Patil et al. | |
| 2016/0226566 A1 | 8/2016 | Hirsch et al. | |
| 2016/0381636 A1* | 12/2016 | Park | H04W 52/0229 |
| | | | 370/311 |

OTHER PUBLICATIONS

Jin et al., "WiZi-Cloud: Application-Transparent Dual ZigBee-WiFi Radios for Low Power Internet Access," Infocom, Proceedings IEEE, Apr. 10, 2011, pp. 1593-1601, XP031953340, DOI: 10.1109/INFCOM.2011.5934951, ISBN: 978-1-4244-9919-9, Institute of Electrical and Electronics Engineers.

* cited by examiner

|  | Bluetooth Low Energy | 802.11ac 2x2 MIMO | 802.11ad |
|---|---|---|---|
| Throughput (bps) | 1 Mbps | 600 Mbps | 4 Gbps |
| Power Efficiency (watts/bps) | 10 mW/Mbps | 7 mW/Mbps | < 1 mW/Mbps |
| Wake-up Time for Traffic Beacon (seconds) | 1 msec | 3 msec | 5 msec |
| Total Power for Traffic Beacon (amps) | 250 uA | 1 mA | 5 mA |

TECHNIQUES TO REDUCE POWER CONSUMPTION IN MOBILE DEVICE DURING LOW-POWER MODE

BACKGROUND

The following relates generally to a method of communicating using a wireless device, and more specifically to techniques to reduce power consumption in mobile device during low-power mode.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include access points (APs) that may communicate with one or more stations (STAs) or mobile devices. An AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

To conserve power, a mobile device (e.g., a smartphone) may enter a low-power mode when not in use (e.g., connected standby). During the low-power mode, the mobile device may not be able to communicate data to and receive data from an AP, except at regular intervals. In some wireless communication systems, a delivery traffic indication message (DTIM) may be used to inform the mobile device that is in low-power mode about the presence of buffered unicast or multicast data waiting to be transmitted to the mobile device. The AP may send the DTIM at predetermined times based on an agreed-upon time interval. The mobile device, in turn, may wake-up all, or a portion, of its components at those predetermined times to listen for the DTIM. If the traffic indication message indicates that the AP has buffered data for the mobile device, the mobile device may wake-up to receive the buffered data.

SUMMARY

The described techniques relate to improved methods, systems, devices, or apparatuses that support techniques to reduce power consumption in mobile device during low-power mode. During a first negotiation, it is determined whether the AP and the mobile device are capable of communicating via a low-power radio access technology (RAT). During a second negotiation, communication parameters for using the low-power RAT are agreed upon between the access point and the mobile device. Communications via the low-power RAT may be made while the mobile device is in a low-power mode.

A method of communicating using a wireless device is described. The method may include performing a first negotiation with an access point using a first RAT, the first RAT may be associated with a first throughput level and a first power consumption level, determining, from the first negotiation, that the access point supports communication through a second RAT that is different from the first RAT. The second RAT may be associated with a second throughput level and a second power consumption level, the second throughput level and the second power consumption level are less than the first throughput level and the first power consumption level, entering a low-power mode, and receiving, from the access point via the second RAT, a traffic message while in the low-power mode, the traffic message indicating whether the access point comprises buffered data to be transmitted to the wireless device via the first RAT.

An apparatus for communicating using a wireless device is described. The apparatus may include means for performing a first negotiation with an access point using a first radio access technology (RAT), the first RAT associated with a first throughput level and a first power consumption level, means for determining, from the first negotiation, that the access point supports communication through a second RAT that is different from the first RAT based, the second RAT associated with a second throughput level and a second power consumption level, the second throughput level and the second power consumption level are less than the first throughput level and the first power consumption level, means for entering a low-power mode, and means for receiving, from the access point via the second RAT, a traffic message while in the low-power mode, the traffic message indicating whether the access point comprises buffered data to be transmitted to the wireless device via the first RAT.

Another apparatus for communicating using a wireless device is described. The apparatus may include a processor, memory in electronic communication with the processor, and instructions stored in the memory. The instructions may be operable to cause the processor to perform a first negotiation with an access point using a first radio access technology (RAT), the first RAT associated with a first throughput level and a first power consumption level, determine, from the first negotiation, that the access point supports communication through a second RAT that is different from the first RAT based, the second RAT associated with a second throughput level and a second power consumption level, the second throughput level and the second power consumption level are less than the first throughput level and the first power consumption level, enter a low-power mode, and receive, from the access point via the second RAT, a traffic message while in the low-power mode, the traffic message indicating whether the access point comprises buffered data to be transmitted to the wireless device via the first RAT.

A non-transitory computer readable medium for communicating using a wireless device is described. The non-transitory computer-readable medium may include instructions operable to cause a processor to perform a first negotiation with an access point using a first radio access technology (RAT), the first RAT associated with a first throughput level and a first power consumption level, determine, from the first negotiation, that the access point supports communication through a second RAT that is different from the first RAT based, the second RAT associated with a second throughput level and a second power consumption level, the second throughput level and the second power consumption level are less than the first throughput level and the first power consumption level, enter a low-power mode, and receive, from the access point via the second RAT, a traffic message while in the low-power mode, the traffic message indicating whether the access point comprises buffered data to be transmitted to the wireless device via the first RAT.

Some examples of the method, apparatus, and non-transitory computer-readable medium described above may further include processes, features, means, or instructions for initializing first RAT antenna components based at least in part on receiving the traffic message. Some examples of the method, apparatus, and non-transitory computer-readable medium described above may further include processes, features, means, or instructions for receiving, via the first RAT, the buffered data from the access point using the first RAT antenna components.

Some examples of the method, apparatus, and non-transitory computer-readable medium described above may further include processes, features, means, or instructions for performing a second negotiation with the access point to determine a first time interval for communicating the traffic message via the second RAT, the first time interval may be based at least in part on power consumption parameters of the wireless device.

Some examples of the method, apparatus, and non-transitory computer-readable medium described above may further include processes, features, means, or instructions for determining a second time interval that may be different from the first time interval, the second time interval may be based at least in part on using the second RAT to communicate traffic messages. Some examples of the method, apparatus, and non-transitory computer-readable medium described above may further include processes, features, means, or instructions for initializing first RAT antenna components at predetermined times based at least in part on the second time interval. Some examples of the method, apparatus, and non-transitory computer-readable medium described above may further include processes, features, means, or instructions for receiving, from the access point via the first RAT, a sync message at predetermined times according to the second time interval.

In some examples of the method, apparatus, and non-transitory computer-readable medium described above, receiving the traffic message further comprises: initializing second RAT antenna components at predetermined times based at least in part on the time interval of the traffic message. Some examples of the method, apparatus, and non-transitory computer-readable medium described above may further include processes, features, means, or instructions for receiving, via the second RAT, the traffic message from the access point using the second RAT antenna components.

In some examples of the method, apparatus, and non-transitory computer-readable medium described above, determining the access point supports communication via the second RAT further comprises: receiving, from the access point via the first RAT, an first indication that the access point may be capable of communicating via the second RAT. Some examples of the method, apparatus, and non-transitory computer-readable medium described above may further include processes, features, means, or instructions for transmitting, to the access point via the first RAT, a second indication that the wireless device may be also capable of communicating via the second RAT.

In some examples of the method, apparatus, and non-transitory computer-readable medium described above, performing the first negotiation comprises: receiving a message from the access point in response to a probe transmitted by the wireless device, the message indicating that the access point may communicate via the first RAT and the second RAT.

Some examples of the method, apparatus, and non-transitory computer-readable medium described above may further include processes, features, means, or instructions for determining that a duration since a last traffic message was received by the wireless device exceeds a time threshold. Some examples of the method, apparatus, and non-transitory computer-readable medium described above may further include processes, features, means, or instructions for receiving, via the first RAT, the traffic message indicating whether the access point comprises the buffered data to be transmitted to the wireless device via the first RAT.

Some examples of the method, apparatus, and non-transitory computer-readable medium described above may further include processes, features, means, or instructions for transmitting, via the first RAT, a lost connection message to the access point indicating that the wireless device may be unable to receive traffic messages via the second RAT.

In some examples of the method, apparatus, and non-transitory computer-readable medium described above, the first RAT may be a wireless local area network that uses the 802.11 standard to communicate messages.

In some examples of the method, apparatus, and non-transitory computer-readable medium described above, the first RAT may be a network that uses the Wi-Gig standard to communicate messages.

In some examples of the method, apparatus, and non-transitory computer-readable medium described above, the second RAT may be a network that uses a Bluetooth Low Energy standard to communicate messages and the traffic message may be a Bluetooth Low Energy advertisement.

A method of a method of communicating using a wireless device is described. The method may include performing a first negotiation with a wireless device using a first radio access technology (RAT), the first RAT associated with a first throughput level and a first power consumption level, determining, from the first negotiation, that the wireless device supports communication through a second RAT that is different from the first RAT, the second RAT associated with a second throughput level and a second power consumption level, the second throughput level and the second power consumption level are less than the first throughput level and the first power consumption level, determining that the wireless device has entered a low-power mode, and transmitting, via the second RAT, a traffic message during the low-power mode of the wireless device, the traffic message indicating whether the access point comprises buffered data to be transmitted to the wireless device via the first RAT.

An apparatus for communicating using a wireless device is described. The apparatus may include means for performing a first negotiation with a wireless device using a first radio access technology (RAT), the first RAT associated with a first throughput level and a first power consumption level, means for determining, from the first negotiation, that the wireless device supports communication through a second RAT that is different from the first RAT, the second RAT associated with a second throughput level and a second power consumption level, the second throughput level and the second power consumption level are less than the first throughput level and the first power consumption level, means for determining that the wireless device has entered a low-power mode, and means for transmitting, via the second RAT, a traffic message during the low-power mode of the wireless device, the traffic message indicating whether the access point comprises buffered data to be transmitted to the wireless device via the first RAT.

Another apparatus for communicating using a wireless device is described. The apparatus may include a processor, memory in electronic communication with the processor, and instructions stored in the memory. The instructions may be operable to cause the processor to perform a first negotiation with a wireless device using a first radio access technology (RAT), the first RAT associated with a first throughput level and a first power consumption level, determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level, determine that the wireless device has entered a low-power mode, and transmit, via the second RAT, a traffic message during the low-power mode of the wireless device, the traffic message indicating whether the access point comprises buffered data to be transmitted to the wireless device via the first RAT.

A non-transitory computer readable medium for communicating using a wireless device is described. The non-transitory computer-readable medium may include instructions operable to cause a processor to perform a first negotiation with a wireless device using a first radio access technology (RAT), the first RAT associated with a first throughput level and a first power consumption level, determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level, determine that the wireless device has entered a low-power mode, and transmit, via the second RAT, a traffic message during the low-power mode of the wireless device, the traffic message indicating whether the access point comprises buffered data to be transmitted to the wireless device via the first RAT.

Some examples of the method, apparatus, and non-transitory computer-readable medium described above may further include processes, features, means, or instructions for receiving a lost connection message from the wireless device via the first RAT, the lost connection message indicating that the wireless device may be unable to receive traffic messages via the second RAT. Some examples of the method, apparatus, and non-transitory computer-readable medium described above may further include processes, features, means, or instructions for transmitting the traffic message via the first RAT during the low-power mode of the wireless device.

Some examples of the method, apparatus, and non-transitory computer-readable medium described above may further include processes, features, means, or instructions for receiving a probe message from the wireless device indicating the wireless device may be capable of communicating with the access point via the first RAT and the second RAT.

Some examples of the method, apparatus, and non-transitory computer-readable medium described above may further include processes, features, means, or instructions for performing a second negotiation with the wireless device to determine a first time interval for communicating the traffic message via the second RAT, the first time interval may be based at least in part on power consumption parameters of the wireless device.

Some examples of the method, apparatus, and non-transitory computer-readable medium described above may further include processes, features, means, or instructions for determining a second time interval that may be different from the first time interval, the second time interval may be based at least in part on using the second RAT to communicate traffic messages. Some examples of the method, apparatus, and non-transitory computer-readable medium described above may further include processes, features, means, or instructions for transmitting, via the first RAT, a sync message to the wireless device at predetermined times based at least in part on the second time interval.

In some examples of the method, apparatus, and non-transitory computer-readable medium described above, the access point refrains from transmitting traffic messages via the first RAT while using the second RAT.

DETAILED DESCRIPTION

Figure 1:
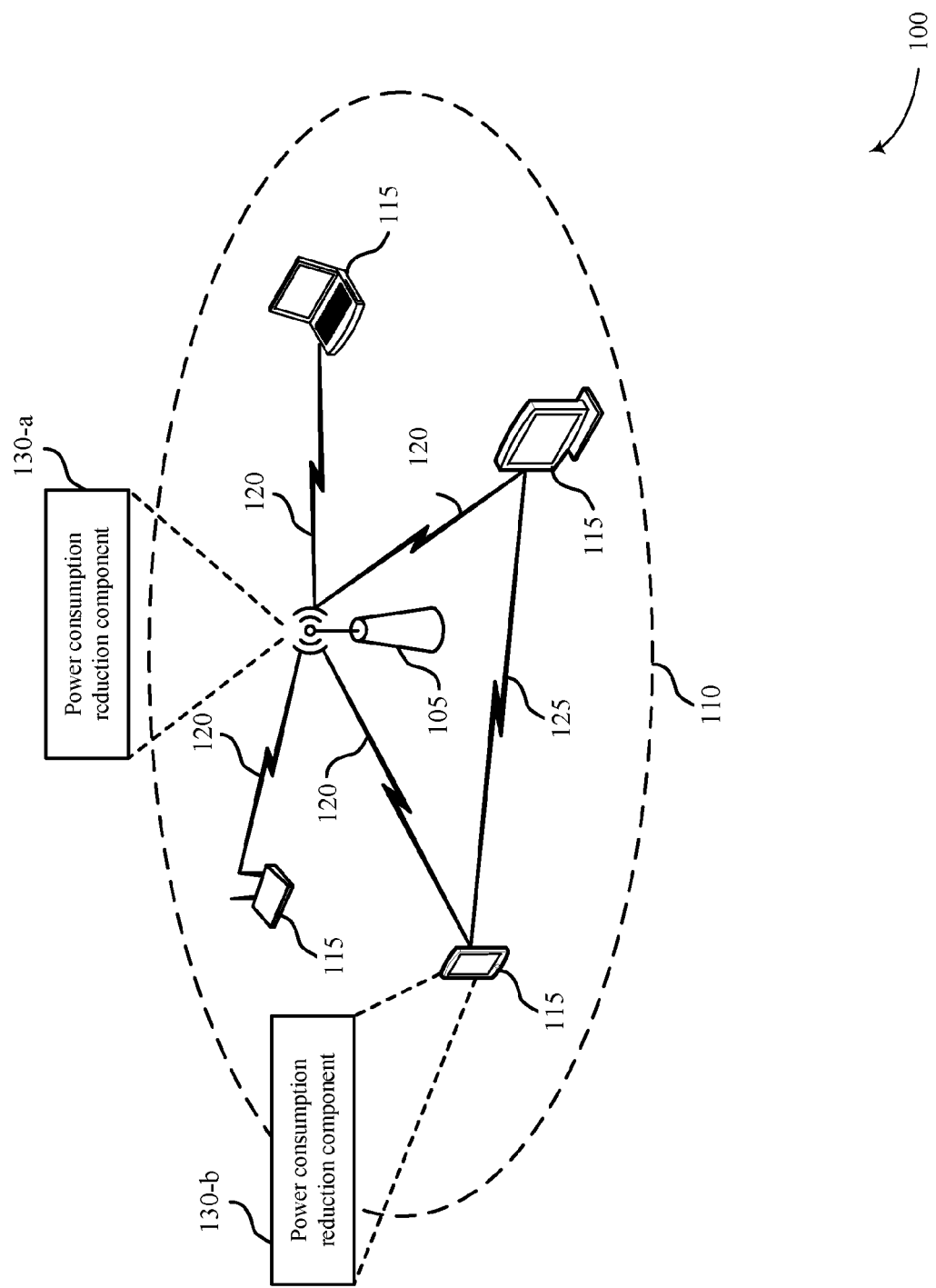
FIG. 1 illustrates an example of a wireless communication system that supports techniques to reduce power consumption in mobile device during low-power mode in accordance with aspects of the present disclosure.

Some radio access technologies (e.g., Wi-Fi) provide good power efficiency in high data rate scenarios. Not all wireless communications, however, require a high data rate. In such wireless communications, it may be more desirable to conserve power than to have a high-throughput of data. For example, when a mobile device is in a low-power mode (e.g., connected standby), the mobile device may wake up at regular intervals and listen for a traffic indication message indicative of whether buffered data is waiting at an access point to be transmitted to the mobile device. The power consumption for powering-up a Wi-Fi radio to listen for a traffic indication message may be greater than the minimum amount of power necessary to perform the operation. For instance, in WLAN in 2.4 GHz and 5 GHz, the power consumption of mobile device in a low-power mode may be between 800 uAmp and 1.4 mAmp per wake-up. A wake-up using a high-speed WLAN radio, such as Wi-Gig, may consume even more power (e.g., between 5-8 mA per wake-up).

During a low-power mode of a mobile device, it may be desirable to use a low-power radio access technology to receive traffic indication messages. In this way, the power efficiency of the mobile device may be increased without sacrificing performance. For example, Bluetooth Low Energy (BLE) provides similar beacon functionality as Wi-Fi, but with lower power consumption. Because sending Wi-Fi traffic indication messages via BLE advertisements is not part of the 802.11 standard, different procedures may be performed by access points and mobile devices to utilize BLE during a low-power mode. For example, during an initial negotiation between an access point and a mobile device, the access point and the mobile device may exchange proprietary information element (IE) fields that indicate that "BLE Advertising for DTIM" is supported by the mobile device and the access point. Once the support for the BLE feature is known, the access point and the mobile device may perform a second negotiation to determine the parameters of their BLE communications. During the low-power mode, the access point may transmit BLE advertisements at regular intervals, and the mobile device may periodically wake up and listen for the BLE advertisements at the same regular intervals. These BLE advertisements may include the information present in a traditional Wi-Fi DTIM beacon. If the BLE advertisement indicates that the access point has information for the wireless device, the BLE hardware in the wireless device may wake up the Wi-Fi communication components to receive the buffered data.

Aspects of the disclosure are initially described in the context of a wireless communications system. In addition, wireless communications between an access point and a mobile device using both a high-throughput RAT and a low-power RAT are shown and described. Aspects of the disclosure are further illustrated by and described with reference to apparatus diagrams, system diagrams, and flowcharts that relate to techniques to reduce power consumption in a mobile device during a low-power mode.

FIG. 1 illustrates a wireless local area network (WLAN) 100 (also known as a Wi-Fi network) configured in accordance with various aspects of the present disclosure. A WLAN is a type of local-area network in which data is sent and received via high-frequency radio waves rather than cables or wires. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a BSS of the WLAN 100. An extended network station (not shown) associated with the WLAN 100 may be connected to a wired or wireless distribution system that may allow multiple APs 105 to be connected in an ESS. During a low-power mode, the AP 105 and a STA 115 may communicate using a low-power RAT different from a normal RAT used for communication, to increase the power efficiencies of the STA 115.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN network 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN network 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

The AP 105 may include a power consumption reduction component 130-*a* and the STA 115 may include a power consumption reduction component 130-*b*. The power consumption reduction components 130-*a*, 130-*b* may cause the AP 105 and the STA 115 to communicate via a low-power RAT during a low-power mode of the STA 115.

Figure 2:
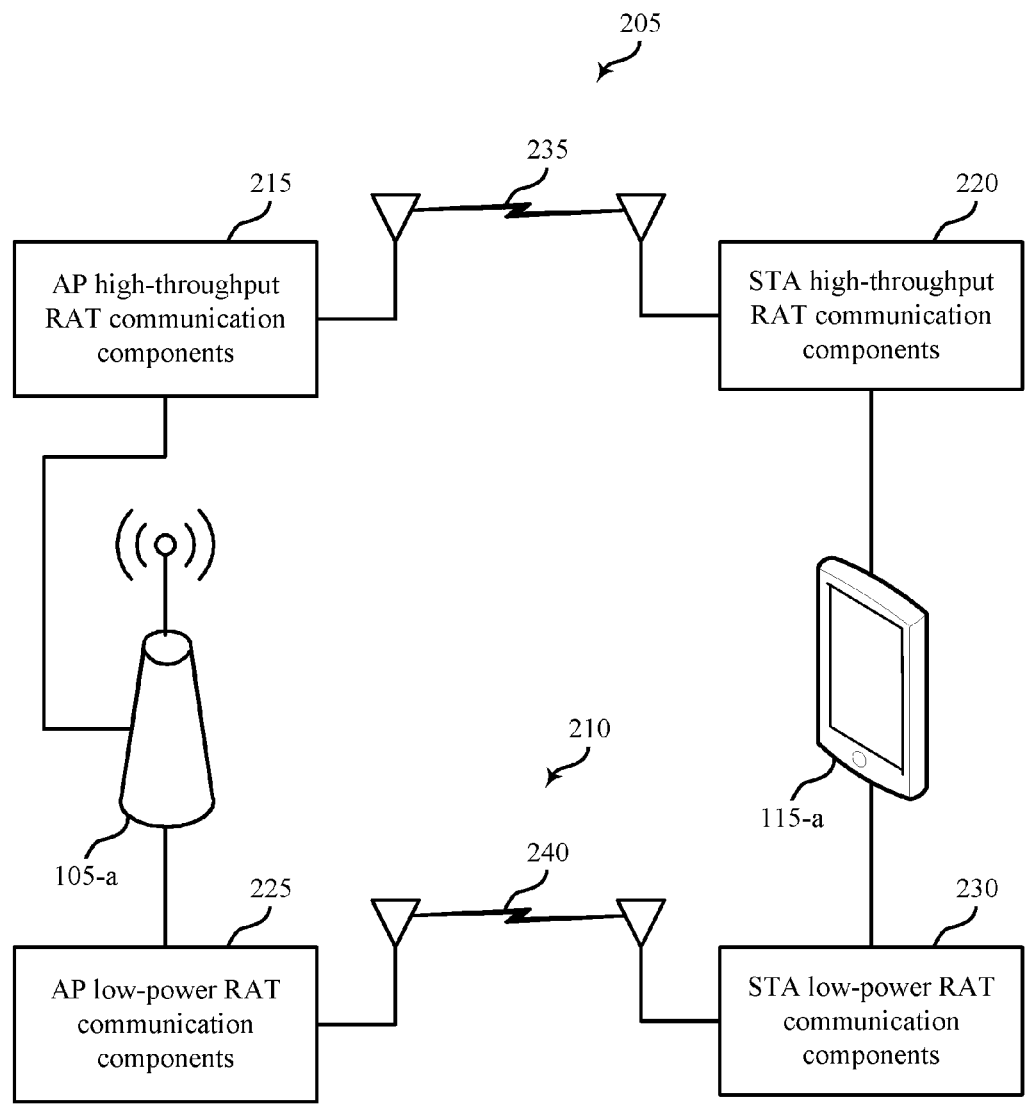
FIG. 2 illustrates an example of a block diagram of a wireless communication system that supports techniques to reduce power consumption in mobile device during low-power mode in accordance with aspects of the present disclosure.

FIG. 2 illustrates a wireless communications network 200 between an AP 105-*a* and a STA 115-*a*. The AP 105-*a* and the STA 115-*a* may be examples of the AP 105 and STA 115 of FIG. 1. In some examples, the STA 115-*a* is a mobile device operating on power provided by a battery or some other mobile power source. The wireless communications network 200 includes two radio access technologies (RATs), a high-throughput RAT 205 and a low-power RAT 210. A radio access technology is the underlying physical connection method for a radio based communication network.

The high-throughput RAT 205 includes a throughput level and a power consumption level. The throughput level may indicate how much data per second (e.g., bps) may be communicated using the high-throughput RAT 205. The power consumption level may indicate an amount of power consumed given an amount of time of use of the high-throughput RAT communication components. For example, the power consumption level may be measured in watts per second. The high-throughput RAT 205 may be a Wi-Fi RAT using one of the IEEE 802.11 standards to implement WLAN computer communications. For example, the high-throughput RAT 205 may be a MIMO Wi-Fi such as 802.11ac 2×2 MIMO. In another example, the high-throughput RAT 205 may be Wi-Gig, which is configured to establish computer communications using the IEEE 802.11ad standard. The Wi-Gig standard may be configured to provide high throughput of data (e.g., around 6-7 Gigabits-per-second) using around two Gigaherz of spectrum at the 60 GHz band. The IEEE 802.11ad standard may be backwards compatible with other IEEE 802.11 standards.

The low-power RAT 210 may include a throughput level and a power consumption level. The throughput level and the power consumption level of the low-power RAT 210 may be different from the throughput level and the power consumption level of the high-throughput RAT 205. In the illustrative example, the throughput level and the power consumption level of the low-power RAT 210 may be less than their respective levels of the high-throughput RAT 205. For example, the low-power RAT 210 may transmit data at a slower rate of speed, but the low-power RAT 210 may transmit data using less power per second of use. The low-power RAT 210 may establish communications using a standard such as Bluetooth Low Energy (BLE). BLE may operate in a similar spectrum range as a normal Bluetooth standard (e.g., 2.4 GHz-2.4835 GHz), but BLE may use different channels. BLE may enable devices to consume less power while communicating messages via BLE than using other RATs (e.g., Bluetooth, or IEEE 802.11 standards).

The AP 105-a may include high-throughput RAT communication components 215 and low-power RAT communication components 220. Such communication components may include antennas, power amplifiers, digital to analog converters, or any other electronic equipment used to communicate using a particular RAT.

The STA 115-a may include high-throughput RAT communication components 225 and low-power RAT communication components 230. Such communication components may include antennas, power amplifiers, digital to analog converters, or any other electronic equipment used to communicate using a particular RAT.

Using the components 215, 215, the AP 105-a and the STA 115-a may establish a high-throughput RAT communication link 235 for communicating data using the high-throughput RAT 205. Similarly, using the components 220, 220, the AP 105-a and the STA 115-a may establish a low-power RAT communication link 240 for communicating data using the low-power RAT 210. In some examples, the AP 105-a and the STA 115-a may communicate simultaneously using both communication links 235, 240. In other examples, the AP 105-a and the STA 115-a may communicate using one of the communication links 235, 240 at a time.

For communications having a lower data rate requirement than other communications, it may be desirable to use a low-power RAT 210 to improve the power efficiency of the STA 115-a. When a communication has a lower data rate requirement, power may be saved without sacrificing performance. For example, when the STA 115-a enters a low-power mode (e.g., connected standby), traffic messages (or traffic indication messages) are transmitted from AP 105-a to the STA 115-a at periodic intervals. The traffic messages may indicate whether the AP 105-a has buffered data waiting to be transmitted to the STA 115-a. Because a traffic message is a smaller type of communication, it does not need a high-throughput to accomplish its functions, and a low-power RAT 210 may be used to communicate the traffic messages.

Figure 3:
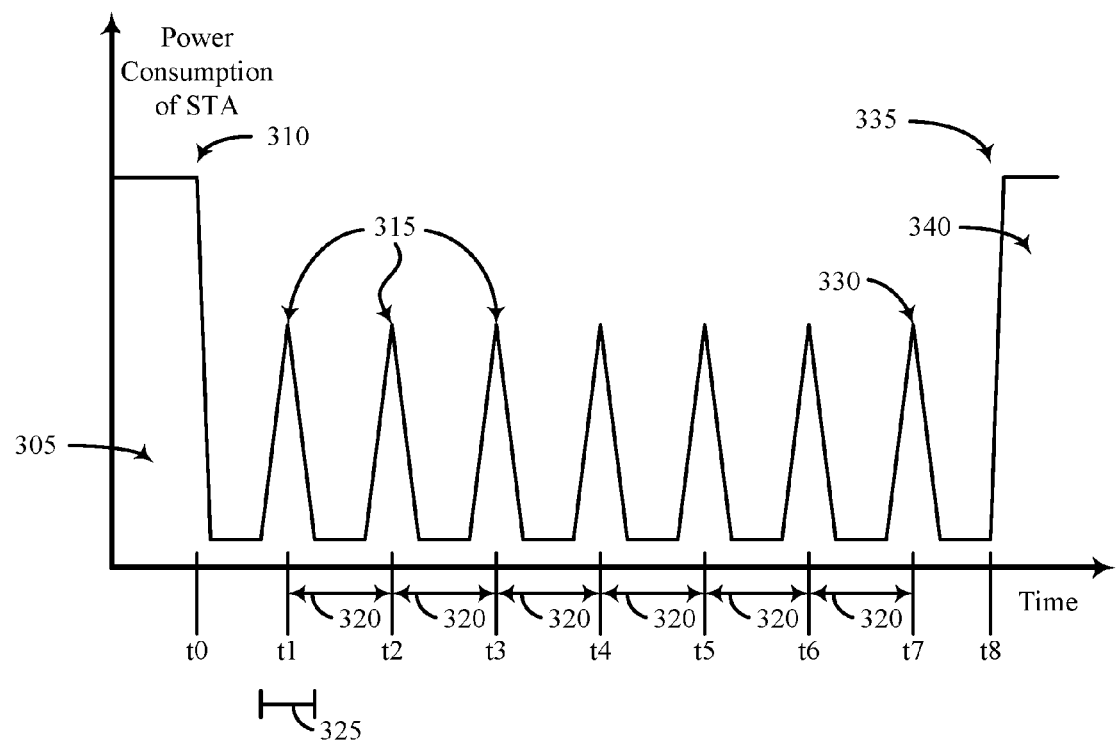
FIG. 3 illustrates an example of a diagram of a power consumption of a wireless device over time in accordance with aspects of the present disclosure.

FIG. 3 shows a diagram 300 of a power consumption of a STA 115 using a high-throughput RAT 205, such as Wi-Fi, to communicate with an AP 105, in accordance with various aspects of the present disclosure. The diagram 300 is provided for illustrative purposes only and is not indicative of any relative values or actual dimensions of any measurements. The y-axis of the diagram 300 represents the current power consumption of the STA 115. The x-axis of the diagram 300 represents time.

At area 305, the STA 115 is operating in a normal-operation mode where the communication components of the STA 115 are powered and are transmitting and receiving messages. During a normal operation mode, a user of the STA 115 may use the STA to perform other actions, such as search the internet or play a game. In some examples, the STA 115 may be using the high-throughput RAT 205 as its primary communication RAT during the normal operation mode. For example, the STA 115 may use Wi-Fi to communicate data during the normal operation mode.

At event 310 (i.e., t0), the STA 115 may enter a low-power mode such as a connected standby or a sleep mode. The low-power mode may be entered because of inactivity of the STA 115, because a user of the STA 115 indicated that the STA 115 should enter the low-power mode, etc. After the STA 115 enters the low-power mode, the power consumption of the STA 115 drops from a first level of power consumption to a second level of power consumption that is lower than the first level of power consumption.

Because data may be sent to the STA 115 at any given time, the STA 115 may execute a number of wake-up events 315 during the low-power mode to determine if data needs to be sent to the STA 115. For example, the STA 115 may receive updates for one or more applications installed on the STA 115 or the STA 115 may receive a message for the user via email, SMS or voice technology.

The wake-up events 315 may include powering the communication components associated with a certain RAT and listening for a traffic message indicating that an AP 105 has data waiting to be transmitted to the STA 115. The wake-up events 315 may occur at predetermined times based at least in part on a time interval 320. In some examples, the time interval 320 is predetermined between the AP 105 and the STA 115 prior to the STA 115 entering a low-power mode. As shown in FIG. 3, wake-up events 315 may occur at t1, t2, t3, t4, t5, t6, and t7, where the predetermined time interval 320 is between each wake-up time. In some examples, the time interval is variable between wake-up events 315. At each of the predetermined times, the AP 105 may transmit the traffic message to the STA 115. The AP 105 and the STA 115 cooperate such that the wake-up event 315 occurs simultaneously with a transmission of a STA-specific traffic indication message. It takes a duration 325 to fully power-up and power-down the communication components for a wake-up event 315. The duration 325 may depend on the type of communication components being powered. The total power consumption for a wake-up event 315 may be determined based at least in part by determining how much power the communication components use during the wake-up event 315.

If the traffic message indicates that the AP 105 includes buffered data waiting to be transmitted to the STA 115, the STA 115 may wake-up and receive the buffered data. For example, during a wake-up event 330, the STA 115 may receive a traffic message indicating that data is waiting at the AP 105 for the STA 115. Once the traffic message is received, the STA 115 may leave the low-power mode at event 335 (i.e., t8). After leaving the low-power mode, the STA 115 may enter an operation mode represented by area 340. While in the operation mode, the STA 115 may receive the buffered data. In some examples, the operation mode may include leaving the low-power mode and entering a normal-operation mode. In some examples, the operation mode may include waking up the electronic components of the STA 115 needed to receive and process the buffered data.

Figure 4:
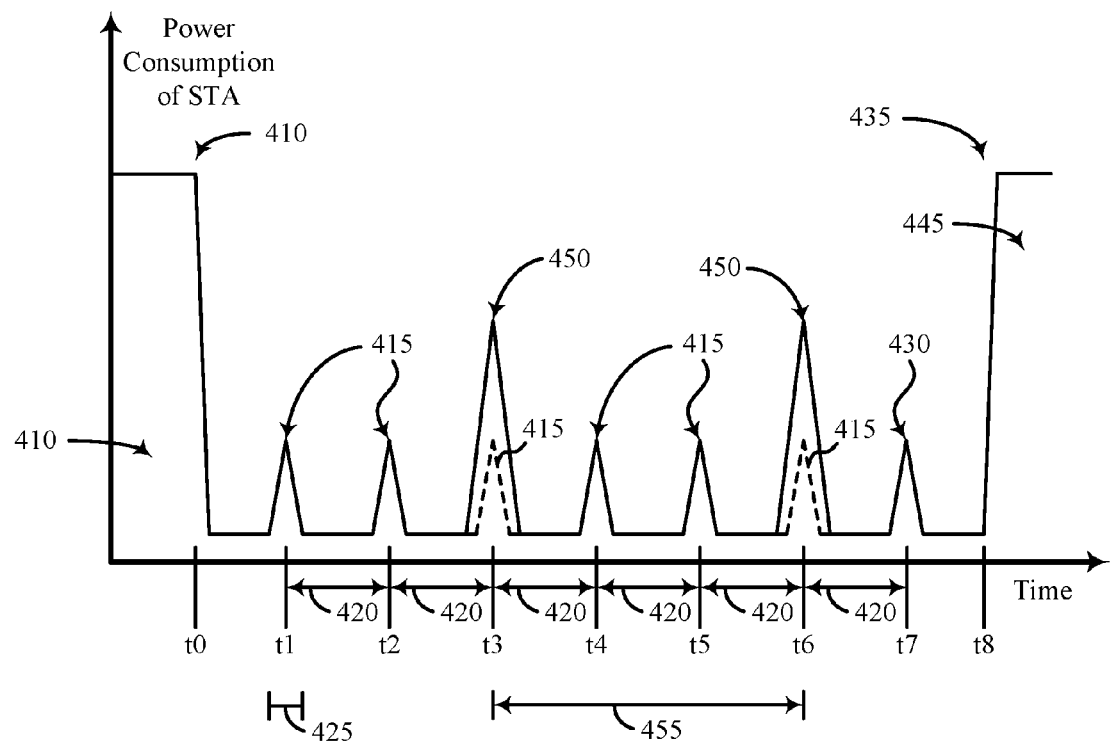
FIG. 4 illustrates an example of a diagram of a power consumption of a wireless device over time in accordance with aspects of the present disclosure.

FIG. 4 shows a diagram 400 illustrating power consumption of a STA 115 using a high-throughput RAT 205 and a low-power RAT 210 to communicate with an AP 105 in accordance with various aspects of the present disclosure. The diagram 400 is provided for illustrative purposes only and is not indicative of any relative values or actual dimensions of any measurements. The y-axis of the diagram 400 represents the current power consumption of the STA 115. The x-axis of the diagram 400 represents time. Many elements of the diagram 400 may be similar to elements of diagram 300 described above. As such, elements having similar numbering between the two diagrams may be embodied similarly and not all descriptions of the different elements are repeated below.

At area 405, the STA 115 is operating in a normal-operation mode where the communication components of the STA 115 are powered on and are transmitting and receiving messages. During this normal operation mode, the STA 115 may be communicating using the high-throughput RAT 205 (e.g., Wi-Fi). At event 410 (i.e., t0), the STA 115 may enter a low-power mode such as a connected standby or a sleep mode. After the STA 115 enters the low-power mode, the power consumption of the STA 115 drops from a first level of power consumption to a second level of power consumption that is lower than the first level of power consumption.

In an effort to conserve power, the STA 115 may negotiate with the AP 105 to use the low-power RAT 210 during the low-power mode. The low-power RAT 210 may be designed to consume less power per-wake-up event than the high-throughput RAT 205. Because data may be sent to the STA 115 at any given time, the STA 115 may execute a number of wake-up events 415 using the low-power RAT 210 during the low-power mode. The wake-up events 415 allow the STA 115 to determine if the STA 115 should power-up and receive data from the AP 105.

The wake-up events 415 may include powering the low-power RAT communication components 220 of the low-power RAT 210 and listening for a traffic message via communication link 240 indicating that the AP 105 has data waiting to be transmitted to the STA 115. The wake-up events 415 may occur at predetermined times based at least in part on a time interval 420. In some examples, the time interval 420 is predetermined between the AP 105 and the STA 115 during a negotiation. In some examples, the time interval 420 may be based at least in part on power parameters of the STA 115. In some examples, the time interval 420 is the same time interval used for the high-throughput RAT 205. In some examples, the time interval 420 may be a unique value based on a default time interval set for the specific low-power RAT 210. For example, a standard time interval between BLE advertisements may be different than a standard time interval between DTIM messages in Wi-Fi. In some examples, the time interval 420 is determined prior to the STA 115 entering a low-power mode. In some examples, the time interval is variable between wake-up events 415.

At each of the predetermined times (e.g., t1, t2, etc.), the AP 105 may transmit the traffic message to the STA 115. The AP 105 and the STA 115 cooperate such that the wake-up event 315 occurs simultaneously with a transmission of a STA-specific traffic indication message. It takes a duration 425 to fully power-up and power-down the low-power RAT communication components 230 for a wake-up event 415. In some examples, the duration 425 may be less than the duration 325. The total power consumption for a wake-up event 415 may be determined based at least in part on determining how much power the communication components use during the wake-up event 415. In some examples, the total power consumption of a wake-up event 415 may be less than the total power consumption of a wake-up event 415.

If the traffic message includes an indication that the AP 105 includes buffered data waiting to be transmitted to the STA 115, the STA 115 may wake-up and receive the buffered data. For example, during a wake-up event 430, the STA 115 may receive a traffic message indicating that data is waiting at the AP 105 for the STA 115. Once the traffic message is received, the STA 115 may leave the low-power mode at event 435 (i.e., t8). After leaving the low-power mode, the STA 115 may enter an operation mode represented by area 340. While in the operation mode, the STA 115 may receive the buffered data. In some examples, the operation mode may include leaving the low-power mode and entering a normal-operation mode. In some examples, the operation mode may include waking up the electronic components of the STA 115 needed to receive and process the buffered data.

In some examples, the STA 115 may execute a number of first RAT wake-up events 440 during the low-power mode. The wake-up events 440 may relate to the high-throughput RAT 205. Because the STA 115 is configured to communicate using the high-throughput RAT 205 during a normal operation mode, the STA 115 may periodically sync with the AP 105 via the communication link 235 to perform housekeeping functions for the high-throughput RAT 205. For example, the wake-up events 440 may include powering-up the high-throughput RAT communication components 215 at predetermined times and listening for a sync message from the AP 105. The predetermined times may be based on a time interval 445. In some examples, the time interval 445 is longer than the time interval 420 for the low-power wake-up events 415. In some examples, the time interval 445 is every 30 seconds. This is only one example of a time interval 445 and other time intervals may apply. The time interval 445 may be predetermined during a negotiation between the AP 105 and the STA 115. In some examples, the time interval 445 is negotiated during the same negotiation as the time interval 420.

The AP 105 may be configured to transmit the sync message to the STA 115 at the same predetermined times (e.g., t3 and t6). In some examples, the wake-up events 440 may be similar to the wake-up event 315. The sync message may include information useful to maintain communications via the high-throughput RAT 205. For example, the sync message may include information so that the STA 115 can sync its internal clock to the clock of the AP 105. In the illustrative example of FIG. 4, the wake-up events 440 are aligned with the wake-up events 415. In other examples, however, the wake-up events 440 are completely independent of the wake-up events 415. In such examples, the wake-up events 440 may fully overlap, partially overlap, or not overlap at all with the wake-up events 415.

Figure 5:
FIG. 5 illustrates an example of a table showing characteristics of different radio access technologies in accordance with various aspects of the present disclosure.

FIG. 5 shows a table 500 illustrating characteristics of different RATs, in accordance with various aspects of the present disclosure. The table 500 illustrates examples of wake-up times and total power usages for wake-up events using different RATs. For example, table 500 compares these characteristics for BLE, Wi-Fi, and Wi-Gig. As shown in table 500, a typical wake-up event using BLE communication components may last up to 1 millisecond and may consume up to 250 microamperes of power. A typical wake-up event using Wi-Fi communication components may last up to 3 milliseconds and may consume up to 1 milliampere of power. A typical wake-up event using Wi-Gig communication components may last up to 5 milliseconds and may consume up to 5 milliamperes of power. Table 500 illustrates only one example of characteristics of these RATs and other examples are possible.

Figure 6:
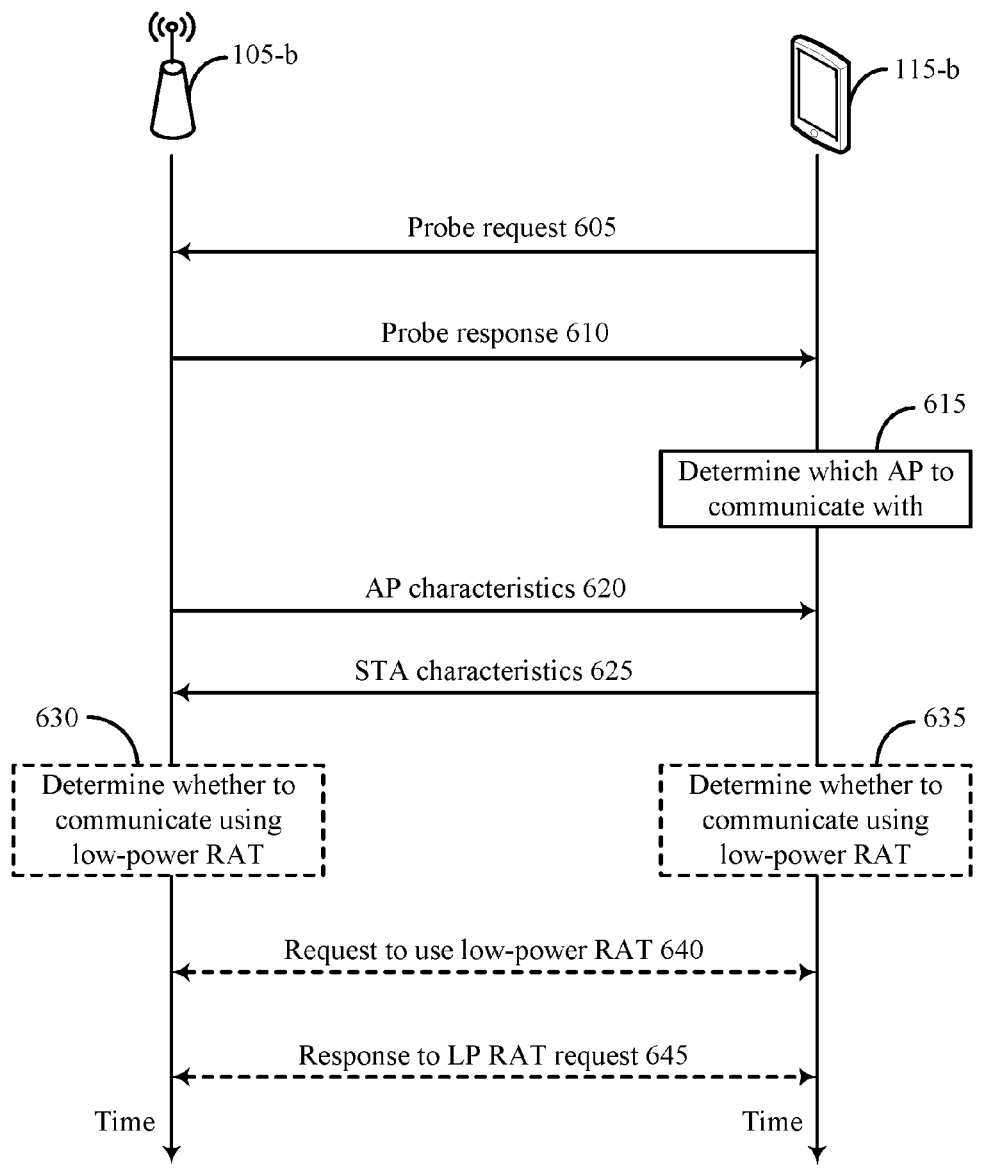
FIG. 6 illustrates an example of a communication scheme that supports techniques to reduce power consumption in mobile device during low-power mode in accordance with aspects of the present disclosure.
Figure 7:
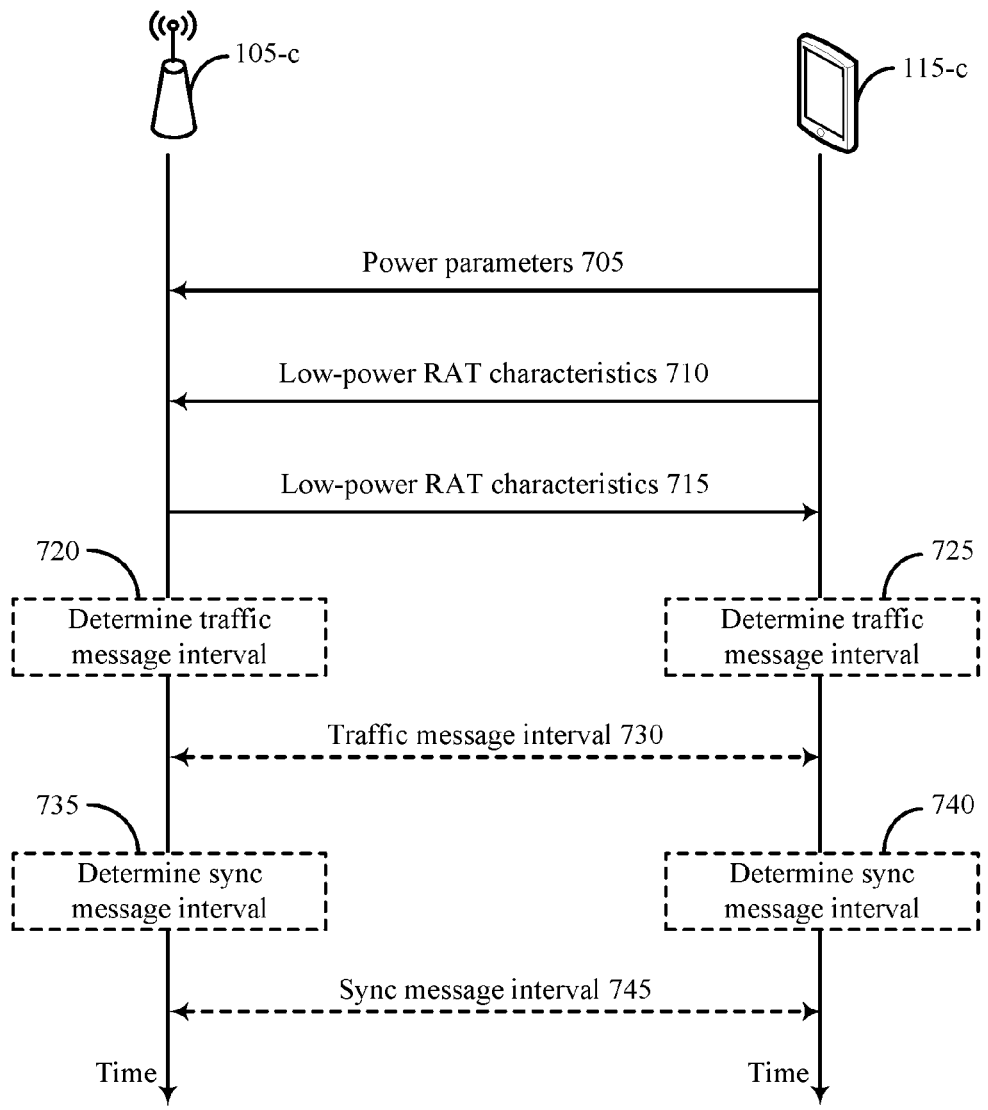
FIG. 7 illustrates an example of a communication scheme that supports techniques to reduce power consumption in mobile device during low-power mode in accordance with aspects of the present disclosure.
Figure 8:
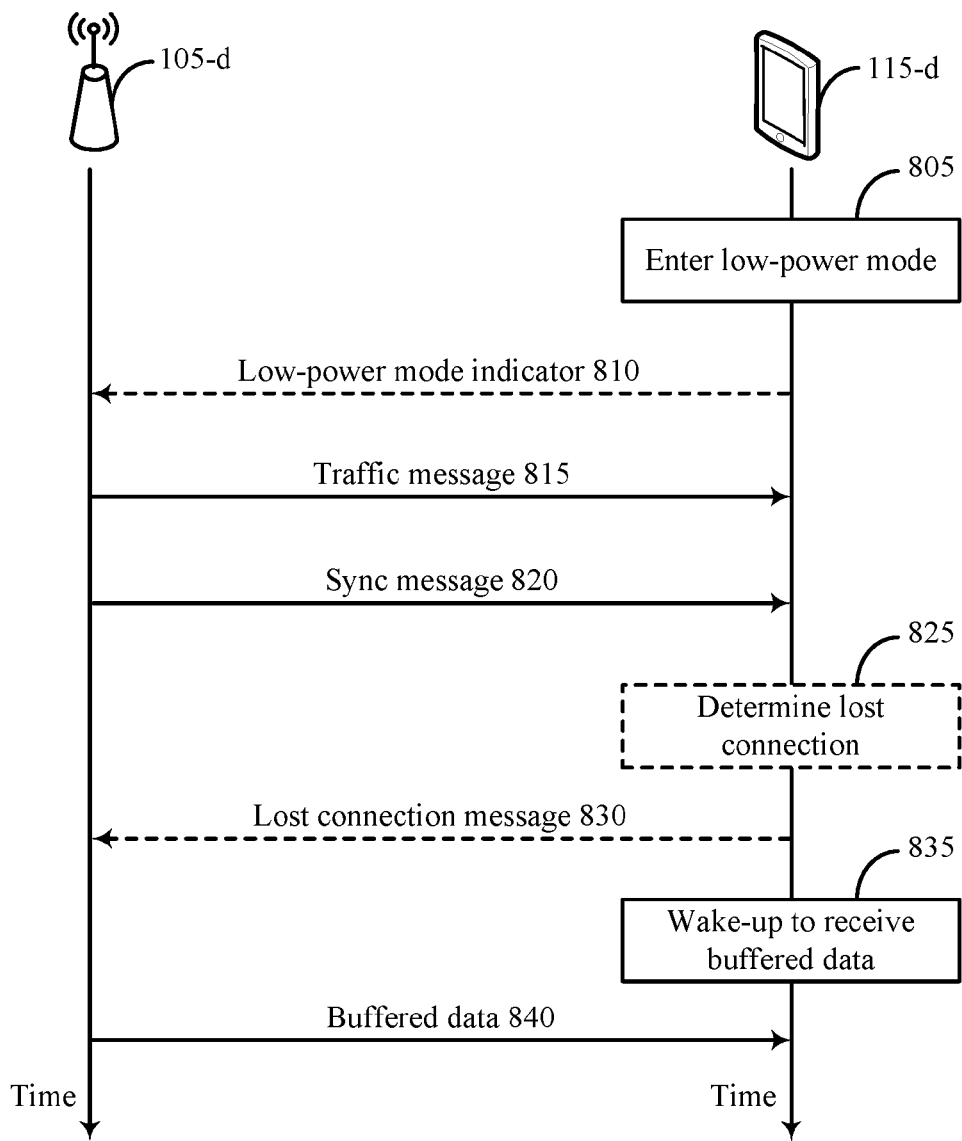
FIG. 8 illustrates an example of a communication scheme that supports techniques to reduce power consumption in mobile device during low-power mode in accordance with aspects of the present disclosure.

FIGS. 6-8 illustrate communications between an AP 105 and a STA 115 that support techniques to reduce power consumption in a mobile device during a low-power mode. Because using a low-power RAT 210, such as BLE, during a low-power mode of the STA 115 is not part of most standards, for example it is not part of the Wi-Fi standards, the AP 105 and the STA 115 may cooperate to define unique procedures to communicate using the low-power RAT 210. To determine the procedures for the multi-RAT communication, the AP 105 and the STA 115 may engage in two separate negotiations. During a first negotiation (e.g., communication scheme 600), the AP 105 and the STA 115 may determine that both support communication via the low-power RAT. During a second negotiation (e.g., communication scheme 700), the AP 105 and the STA 115 may determine communication parameters specific to the low-power RAT 210. For example, during the second negotiation, the time interval between traffic messages may be determined or the time interval between sync messages may be determined. Later, during a low-power mode of the STA 115 (e.g., communication scheme 800), additional communications may occur to coordinate communications via both the high-throughput RAT 205 and the low-power RAT 210.

As used in this disclosure, the term low-power mode may refer to one of many power conservation techniques that may be associated with a STA 115 or a RAT being used by the STA 115 to communicate messages over a network. In some examples, a low-power mode may include a connected stand-by mode or one of the power saving techniques associated with the IEEE 802.11 communication standards, and the functions described herein may be implemented in conjunction with any of the previous low power modes. In some examples, the low-power mode may include a dedicated low-power mode that implements the functions described herein. The functions described herein may augment or add to previous low-power modes, or the functions described herein may replace some functions of previous low-power modes. For example, once a STA 115 determines that it has entered some type of low power mode, the STA 115 may then attempt to communicate via a low-power RAT (e.g., BLE) as part of that low power mode. The messages communicated during the low-power mode via the low-power RAT may be similar to or identical to the messages communicated during the previous low-power mode. The difference being that the messages are communicated via a different RAT than what is normally expected.

In addition, the power saving techniques described herein may co-exist or complement existing power techniques are included in the IEEE 802.11 standards, such as Power Save Mode (PSM), Scheduled Automatic Power Save Delivery (S-APSD), Unscheduled Automatic Power Save Delivery (U-APSD), Wireless Multimedia-Power Save (WMM-PS), Power Save Multi-Poll (PSMP), or Dynamic Power Save. For instance, a STA 115 may implement a PSM, as defined in the IEEE 802.11 standard, simultaneously with the techniques described in this disclosure. In such an instance, the STA 115 may determine that it may communicate using a second RAT different than Wi-Fi, but the STA 115 may not implement those power saving techniques until the STA 115 executes PSM. In another instance, the requests for queued traffic that are part of the S-APSD and the U-APSD may be communicated via a second RAT, such as BLE, rather than a RAT using the IEEE 802.11 standards. In another instance, the messages communicated during PSMP may be done via a second RAT, such as BLE. It should be appreciated that the techniques may be implemented with other typical or well-established power saving techniques associated with the IEEE 802.11 standards.

FIG. 6 shows an example of a communication scheme 600 that supports techniques to reduce power consumption in a mobile device during a low-power mode in accordance with various aspects of the present disclosure. In some examples, the communication scheme 600 may be a first negotiation between the AP 105-*c* and the STA 115-*c*. The AP 105-*b* and the STA 115-*b* may be examples of the AP 105 and STA 115 illustrated in FIGS. 1 and/or 2. In some examples, the first negotiation may occur via a first RAT or the high-throughput RAT. The communication scheme 600 shows one example of communications that may occur during a first negotiation between the AP 105-*b* and the STA 115-*b*. In other examples, the communication scheme 600 may include other messages and/or other communications.

During an initialization process using a high-throughput RAT 205 (e.g., a Wi-Fi network), the STA 115-*b* may search for an AP 105-*b* to connect with. While searching for an AP 105-*b*, the STA 115-*b* may transmit probe requests 605. If an AP 105-*b* receives a probe request 605 from a STA 115-*b*, the AP 105-*b* may transmit a probe response 610 indicating the AP 105-*b* is available. The STA 115-*b* may receive multiple probe responses 610 from multiple APs 105. At block 615, the STA 115-*b* may determine which AP 105 to communicate with based at least in part on information included in the probe responses 610.

In some examples that support techniques to reduce power consumption in a mobile device during a low-power mode, the probe responses 610 may be modified to indicate that the AP 105-*b* is capable of communicating using a low-power RAT 210. In such an example, the STA 115-*b* may use that low-power RAT 210 information in the probe responses 610 to determine which AP 105 to connect with.

After connecting with an AP 105-*b*, the AP 105-*b* may transmit AP characteristics 620 to the STA 115-*b*. Similarly, the STA 115-*b* may transmit STA characteristics 625 to the AP 105-*b*. The characteristics messages 620, 625 may include information about whether their respective participants are capable of communicating via a low-power RAT 210 in addition to the high-throughput RAT 205. For example, the characteristic messages 620, 625 may include information indicating that the AP 105-*b*, the STA 115-*b*, or both are capable of communicating via BLE as well as Wi-Fi. In some examples, the characteristics messages 620, 625 may transmitted simultaneously. In some examples, the characteristics messages 620, 625 may transmitted sequentially, one after another.

At block 630, the AP 105-*b* may determine whether to communicate with the STA 115-*b* using a low-power RAT 210 based at least in part on the STA characteristics 625 received from the STA 115-*b*. If the STA-*b* characteristic message 625 indicates that the STA 115-*b* cannot communicate using the low-power RAT 210, the AP 105-*b* may determine to not communicate with the STA 115-*b* using the low-power RAT. Likewise, at block 635, the STA 115-*b* may determine whether to communicate with the AP 105-*b* using the low-power RAT 210 based at least in part on the AP characteristics 620 received from the AP 105-*b*.

In some examples, only one of the AP 105-*b* or the STA 115-*b* determines whether to communicate using the low-power RAT 210. In such examples, the determining entity (e.g., AP 105-*b* or STA 115-*b*) may transmit a request 640 to use a low-power RAT 210. The non-determining entity (e.g., AP 105-*b* or STA 115-*b*) may then transmit a response 645 to the request 640. The response 645 may include an affirmative response, at which time the AP 105-*b* and the STA 115-*b* agree that they may communicate using the low-power RAT 210. The response 645 may include a negative response, at which time the AP 105-*b* and the STA 115-*b* may restrict their communications to the high-throughput RAT 205 and any other RATs that they may be capable of communicating with. In some examples, the request 640 and the response 645 may not transmitted at all. Instead, in these examples, the AP 105-*b* and the STA 115-*b* may decide to communicate using the low-power RAT 210 based on the characteristic messages 620, 625 alone.

FIG. 7 shows an example of a communication scheme 700 that supports techniques to reduce power consumption in a mobile device during a low-power mode in accordance with various aspects of the present disclosure. In some examples, the communication scheme 700 may be a second negotiation between the AP 105-*c* and the STA 115-*c*. The AP 105-*c* and the STA 115-*c* may be examples of the AP 105 and STA 115 illustrated in FIGS. 1, 2, and/or 6. The second negotiation may be a low-power RAT specific negotiation and may be used to determine one or more communication parameters between the AP 105-*c* and the STA 115-*c* for communicating using the low-power RAT 210. In some examples, the second negotiation may occur via the high-throughput RAT 205. In other examples, the second negotiation may occur via the low-power RAT 210. The communication scheme 700 shows one example of communications that may occur during a second negotiation between the AP 105-*c* and the STA 115-*c*. In other examples, the communication scheme 700 may include other messages and/or other communications. In some examples, the communication scheme 700 may be executed after communication scheme 600 is complete. In some examples, the communication scheme 700 may be executed before every low-power mode entry by the STA 115-*c*.

Before communicating via the low-power RAT 210 during a low-power mode of the STA 115-*c*, the AP 105-*c* and the STA 115-*c* may determine one or more parameters for such communicating. The STA 115-*c* may transmit power parameters 705 and low-power RAT characteristics 710 to the AP 105-*c*. The power parameters 705 may include the amount of power available to the STA 115-*c*, remaining battery of the STA 115-*c*, desired power-efficiency levels, user settings regarding power efficiency or power consumption, and/or other factors. In some examples, the traffic message interval 730 may be based at least in part on these power parameters. The low-power RAT characteristics 710 may include information regarding the STA's 115-*c* specific low-power RAT communication components 230. For example, the low-power RAT characteristics 710 may include channel quality indicators, frequency indicators, and/or other factors. Similarly, the AP 105-*c* may send low-power RAT characteristics 715 to the STA 115-*c* indicative of the AP's specific low-power RAT communication components 215. For example, the low-power RAT characteristics 715 may include a channel quality indicators, frequency indicators, and/or other factors.

At block 720, the AP 105-*c* may determine a traffic message interval based at least in part on the low-power RAT characteristics 710, 715 and/or the power parameters 705. Once the traffic message interval is determined, the AP 105-*c* may transmit the traffic message interval 730 to the STA 115-*c*. The traffic message interval 730 may be embodied as the time interval 320 or the time interval 420. Likewise, at block 725, the STA 115-*c* may determine the traffic message interval 730 based at least in part on the low-power RAT characteristics 710, 715 and/or the power parameters 705. Once the traffic message interval 730 is determined, the STA 115-*c* may transmit the traffic message interval 730 to the AP 105-*c*.

In some examples, only one of the AP 105-*c* or the STA 115-*c* determines the traffic message interval 730. In such examples, the determining entity (e.g., AP 105-*c* or STA 115-*c*) may transmit traffic message interval 730. In some examples, both the AP 105-*c* and the STA 115-*c* determine a traffic message interval 730. In such examples, the traffic message interval 730 may not be communicated between the parties at all.

At block 735, the AP 105 may determine a sync message interval based at least in part on the low-power RAT characteristics 710, 715, the power parameters 705, and/or the traffic message interval 730. Once the sync message interval is determined, the AP 105-*c* may transmit the sync message interval 745 to the STA 115-*c*. The sync message interval 745 may be embodied as the sync interval 455. Likewise, at block 740, the STA 115-*c* may determine the sync message interval 745 based at least in part on the low-power RAT characteristics 710, 715, the power parameters 705, and/or the traffic message interval 730. Once the sync message interval 745 is determined, the STA 115-*c* may transmit the sync message interval 745 to the AP 105-*c*.

In some examples, only one of the AP 105-*c* or the STA 115-*c* determines the sync message interval 745. In such examples, the determining entity (e.g., AP 105-*c* or STA 115-*c*) may transmit sync message interval 745. In some examples, both the AP 105-*c* and the STA 115-*c* determine a sync message interval 745. In such examples, the sync message interval 745 may not be communicated between the parties at all.

FIG. 8 illustrates an example of a communication scheme 800 for techniques to reduce power consumption in a mobile device during low-power mode. The communication scheme 800 may represent communications between the AP 105-*d* and the STA 115-*d* in and around the STA 115-*d* being in a low-power mode. The AP 105-*d* and the STA 115-*d* may be examples of the AP 105 and STA 115 illustrated in FIGS. 1, 2, 6, and/or 7. In some examples, the communication scheme 800 may relate to the time frames depicted in FIGS. 3 and 4. The communication scheme 800 may be executed using either the high-throughput RAT 205, the low-power RAT 210, or a combination of the two. In other examples, the communication scheme 800 may include other messages and/or other communications.

At block 805, the STA 115-d enters a low-power mode. The STA 115-d may enter the low-power mode for a variety of reasons including inactivity or a user command. The AP 105-d may determine that the STA 115-d entered the low-power mode (or is about to enter) in a variety of ways. For example, the STA 115-d may transmit a low-power mode indicator 810 to the AP 105-d. Once the low-power mode indicator 810 is received, the AP 105-d and the STA 115-d may execute procedures to begin operations in a low-power mode. For example, the AP 105-d and STA 115-d may synchronize their low-power mode clocks so that messages are transmitted at the same time that the STA 115-d wakes up to listen for the messages.

During a low-power mode, as already discussed, the AP 105-d may send traffic indication messages 815 to the STA 115-d at predetermined times based at least on the traffic message interval 730. The traffic messages 815 may include information that the AP 105-d has stored data addressed to the STA 115-d and waiting to be sent to the STA 115-d. The traffic message 815 may be transmitted via the high-throughput RAT 205 or the low-power RAT 210. In some examples, the traffic message 815 may be a DTIM beacon used by Wi-Fi. In some examples, the traffic message 815 may be a BLE advertisement.

During the low-power mode, if the traffic messages 815 are being communicated via the low-power RAT, the AP 105-d may transmit sync messages 820 at predetermined times based at least in part on the sync message interval 745. The sync message 820 may be used to perform one or more housekeeping functions to maintain the high-throughput RAT communication link 235 during the low-power mode of the STA 115-d. For example, periodically, the STA 115-d may sync its internal clock to the clock of the AP 105-d via the sync message 820. In some examples, the sync message 820 is transmitted via the high-throughput RAT 205. In some examples, the sync message 820 is transmitted via the low-power RAT 210.

At block 825, the STA 115-d may determine that it is no longer receiving traffic messages 815 and/or sync messages 820 via either the high-throughput RAT 205 or the low-power RAT 210. The STA 115-d may determine a lost connection. Typically, low-power RATs may have a more limited range than a higher-powered RAT (e.g., the high-throughput RAT 205). In some examples, the low-power RAT communication link 240 may be severed or lost, but the high-throughput RAT communication link 235 may still be functioning. In other examples, a lost connection may occur when there are obstructions between the AP 105-d and the STA 115-d. In some examples, the high-throughput RAT communication link 235 may be severed or lost, but the low-power RAT communication link 240 may be maintained.

The STA 115-d may determine whether it is continuing to receive traffic messages 815 and/or sync messages 820 by determining a duration since the last message 815, 820 was received. The STA 115-d may compare the duration to a time threshold. If the duration exceeds the time threshold, the STA 115-d may determine that it is no longer receiving either one or both of the messages 815, 820. In some examples, the time threshold may be different for different types of messages. For example, the time threshold for a sync message 820 may be longer than the time threshold for a traffic message 815. In some examples, the time thresholds may be determined based at least in part on the respective time intervals of the messages 815, 820. For example, a time threshold may be equal to a number of related time intervals.

The STA 115-d may then communicate with the AP 105-d to begin receiving the missing messages 815, 820 using the other RAT. For example, if traffic messages are being sent via the low-power RAT, the STA 115-d may transmit a lost connection message 830 requesting that the AP 105-d send traffic messages 815 via the high-throughput RAT. In some examples, the AP 105-d continues to send traffic messages 815 via both the high-throughput RAT 205 and the low-power RAT 210 even though the STA 115-d is listening to only the low-power RAT 210. In such examples, the STA 115-d may not have to request anything of the AP 105-d if it stops receiving traffic messages 815 via the low-power RAT 210. Instead, the STA 115-d may then just start listening for traffic messages 815 sent via the high-throughput RAT 205 at the predetermined times. In some examples, the STA 115-d may transmit beacons via the low-power RAT 210 during a low-power mode to indicate to the AP 105-d that the STA 115-d is still in range. In these examples, if the AP 105-d stops receiving those beacons, the AP 105-d may begin transmitting the traffic messages 815 via the high-throughput RAT 205.

At block 835, the STA 115-d may determine to wake-up and receive buffered data based at least in part on receiving a traffic message 815 that indicates that buffered data is waiting. The AP 105-d and the STA 115-d may execute one or more procedures to transfer their operations from the low-power mode to a normal operations mode. The AP 105-d may transmit the buffered data 840 to the STA 115-d based at least in part on the STA 115-d indicating that it is ready to receive the buffered data.

Figure 9:
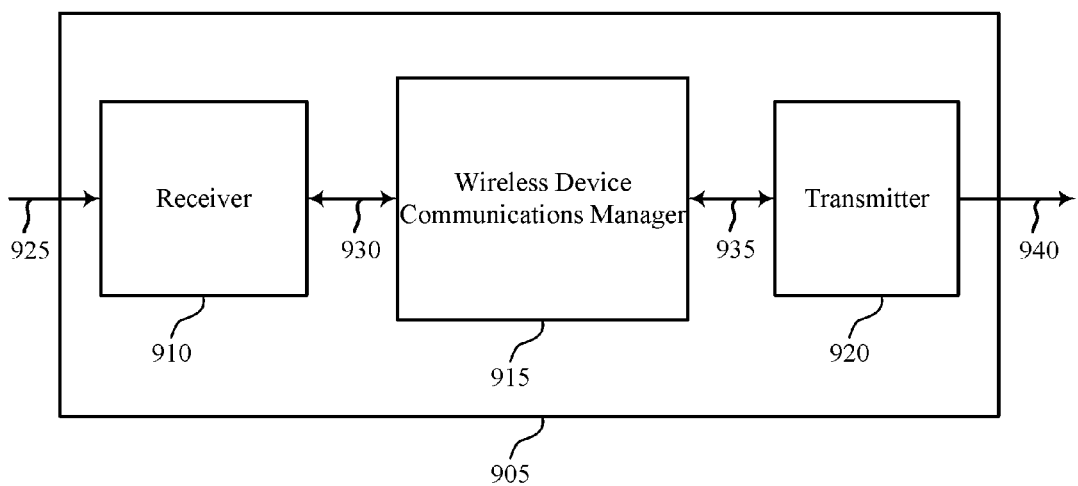
FIGS. 9 through 11 show block diagrams of a device that supports techniques to reduce power consumption in mobile device during low-power mode in accordance with aspects of the present disclosure.

FIG. 9 shows a block diagram 900 of a wireless device 905 that supports techniques to reduce power consumption in mobile device during low-power mode in accordance with various aspects of the present disclosure. Wireless device 905 may be an example of aspects of a STA 115 as described with reference to FIGS. 1, 2, 6, 7, and/or 8. Wireless device 905 may include receiver 910, wireless device communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques to reduce power consumption in mobile device during low-power mode, etc.) via communication link 925. Information may be passed on to other components of the device via communication link 930. The receiver 910 may be an example of aspects of the transceiver 1235 described with reference to FIG. 12. Wireless device communications manager 915 may be an example of aspects of the wireless device communications manager 1215 described with reference to FIG. 12. In some examples, the receiver 910 may include a circuit or circuitry for receiving information over communication link 925.

Wireless device communications manager 915 may perform a first negotiation with an access point using a first RAT, the first RAT associated with a first throughput level and a first power consumption level, determine, from the first negotiation, that the access point supports communication through a second RAT that is different from the first RAT based, the second RAT associated with a second throughput level and a second power consumption level, the second throughput level and the second power consumption level are less than the first throughput level and the first power consumption level, enter a low-power mode, and receive, from the access point via the second RAT, a traffic message while in the low-power mode, the traffic message indicating whether the access point includes buffered data to be transmitted to the wireless device via the first RAT.

Transmitter 920 may transmit signals, via communication link 940, generated by other components of the device. In some examples, the transmitter 920 may receive those signals generated by the other components via communication link 935. In some examples, the transmitter 920 may be collocated with a receiver 910 in a transceiver component. For example, the transmitter 920 may be an example of aspects of the transceiver 1235 described with reference to FIG. 12. The transmitter 920 may include a single antenna, or it may include a set of antennas. In some examples, the receiver 910 may include a circuit or circuitry for receiving information over communication link 935.

Figure 10:
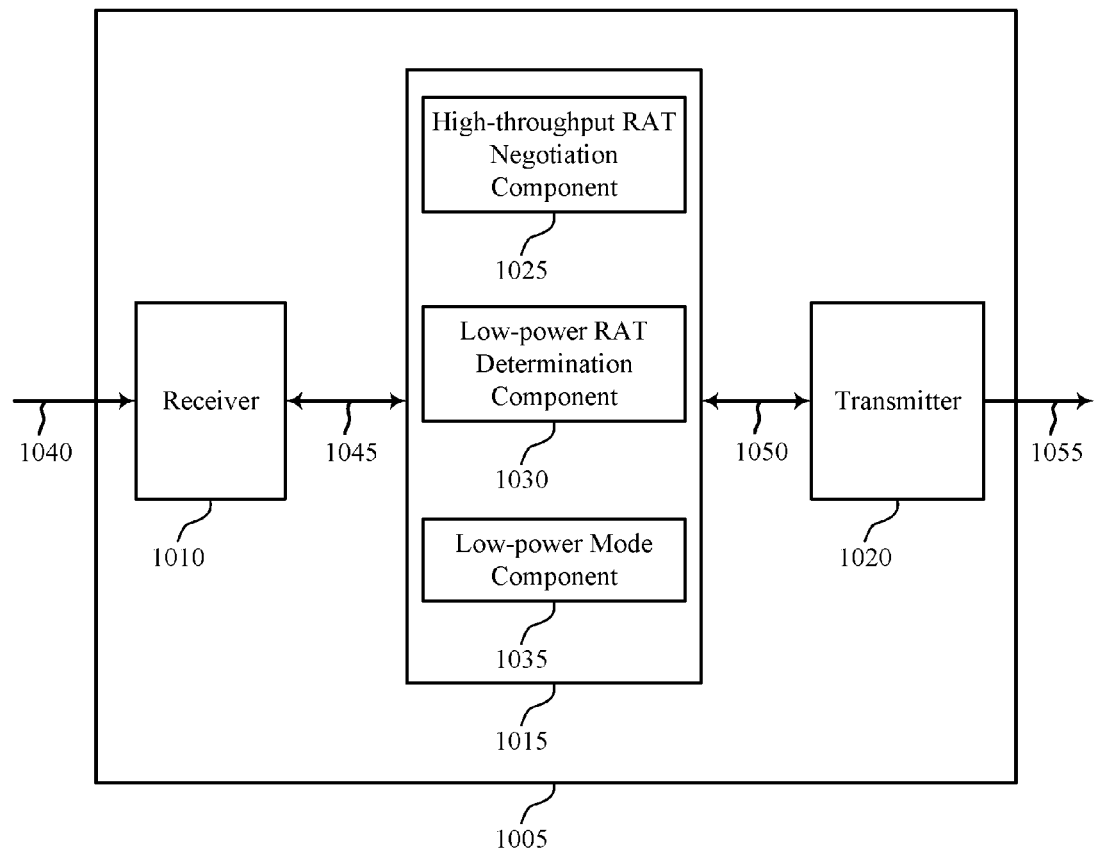

FIG. 10 shows a block diagram 1000 of a wireless device 1005 that supports techniques to reduce power consumption in mobile device during low-power mode in accordance with various aspects of the present disclosure. Wireless device 1005 may be an example of aspects of a wireless device 905 or STA 115 as described with reference to FIGS. 1, 2, 6, 7, 8 and/or 9. Wireless device 1005 may include receiver 1010, wireless device communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques to reduce power consumption in mobile device during low-power mode, etc.) via communication link 1040. Information may be passed on to other components of the device via communication link 1045. The receiver 1010 may be an example of aspects of the transceiver 1235 described with reference to FIG. 12. Wireless device communications manager 1015 may be an example of aspects of the wireless device communications manager 1215 described with reference to FIG. 12.

Wireless device communications manager 1015 may also include high-throughput RAT negotiation component 1025, low-power RAT determination component 1030, and low-power mode component 1035.

High-throughput RAT negotiation component 1025 may perform a first negotiation with an access point using a first RAT, the first RAT associated with a first throughput level and a first power consumption level. In some cases, performing the first negotiation includes: receiving a message from the access point in response to a probe transmitted by the wireless device, the message indicating that the access point may communicate via the first RAT and the second RAT. In some cases, the first RAT is a wireless local area network.

Low-power RAT determination component 1030 may determine, from the first negotiation, that the access point supports communication through a second RAT that is different from the first RAT based, the second RAT associated with a second throughput level and a second power consumption level, the second throughput level and the second power consumption level are less than the first throughput level and the first power consumption level and transmit, to the access point via the first RAT, a second indication that the wireless device is also capable of communicating via the second RAT. In some cases, determining the access point supports communication via the second RAT further includes: receiving, from the access point via the first RAT, an first indication that the access point is capable of communicating via the second RAT.

Low-power mode component 1035 may enter a low-power mode, receive, from the access point via the second RAT, a traffic message while in the low-power mode, the traffic message indicating whether the access point includes buffered data to be transmitted to the wireless device via the first RAT, initialize first RAT antenna components based on receiving the traffic message, receive, via the first RAT, the buffered data from the access point using the first RAT antenna components, initialize first RAT antenna components at predetermined times based on the second time interval, receive, via the second RAT, the traffic message from the access point using the second RAT antenna components, and receive, from the access point via the first RAT, a sync message at predetermined times according to the second time interval. In some cases, receiving the traffic message further includes: initializing second RAT antenna components at predetermined times based on the time interval of the traffic message.

Transmitter 1020 may transmit signals, via communication link 1055, generated by other components of the device. In some examples, the transmitter 1020 may receive those signals generated by the other components via communication link 1050. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
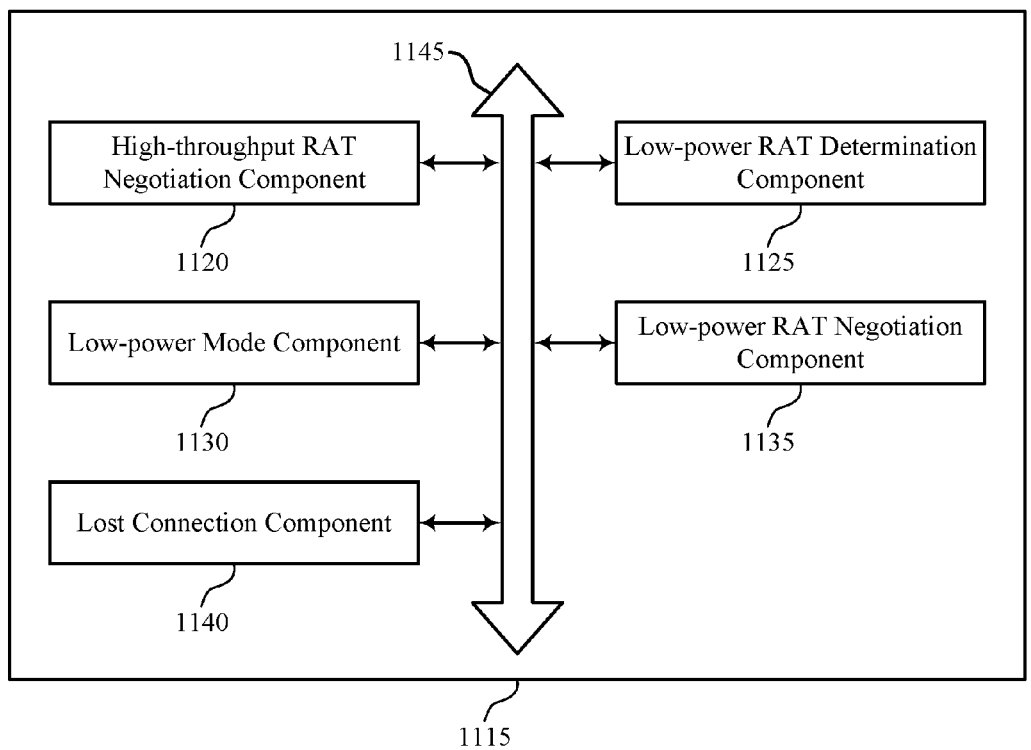

FIG. 11 shows a block diagram 1100 of a wireless device communications manager 1115 that supports techniques to reduce power consumption in mobile device during low-power mode in accordance with various aspects of the present disclosure. The wireless device communications manager 1115 may be an example of aspects of a wireless device communications manager 915, a wireless device communications manager 1015, or a wireless device communications manager 1215 described with reference to FIGS. 9, 10, and/or 12. The wireless device communications manager 1115 may include high-throughput RAT negotiation component 1120, low-power RAT determination component 1125, low-power mode component 1130, low-power RAT negotiation component 1135, and lost connection component 1140. Each of these components may communicate, directly or indirectly, with one another (e.g., via one or more buses 1145).

High-throughput RAT negotiation component 1120 may perform a first negotiation with an access point using a first RAT, the first RAT associated with a first throughput level and a first power consumption level. In some cases, performing the first negotiation includes: receiving a message from the access point in response to a probe transmitted by the wireless device, the message indicating that the access point may communicate via the first RAT and the second RAT. In some cases, the first RAT is a wireless local area network.

Low-power RAT determination component 1125 may determine, from the first negotiation, that the access point supports communication through a second RAT that is different from the first RAT based, the second RAT associated with a second throughput level and a second power consumption level, the second throughput level and the second power consumption level are less than the first throughput level and the first power consumption level and transmit, to the access point via the first RAT, a second indication that the wireless device is also capable of communicating via the second RAT. In some cases, determining the access point supports communication via the second RAT further includes: receiving, from the access point via the first RAT, an first indication that the access point is capable of communicating via the second RAT.

Low-power mode component 1130 may enter a low-power mode, receive, from the access point via the second RAT, a traffic message while in the low-power mode, the traffic message indicating whether the access point includes buffered data to be transmitted to the wireless device via the first RAT, initialize first RAT antenna components based on receiving the traffic message, receive, via the first RAT, the buffered data from the access point using the first RAT antenna components, initialize first RAT antenna components at predetermined times based on the second time interval, receive, via the second RAT, the traffic message from the access point using the second RAT antenna components, and receive, from the access point via the first RAT, a sync message at predetermined times according to the second time interval. In some cases, receiving the traffic message further includes: initializing second RAT antenna components at predetermined times based on the time interval of the traffic message.

Low-power RAT negotiation component 1135 may perform a second negotiation with the access point to determine a first time interval for communicating the traffic message via the second RAT, the first time interval is based on power consumption parameters of the wireless device and determine a second time interval that is different from the first time interval, the second time interval is based on using the second RAT to communicate traffic messages. In some cases, the second RAT is Bluetooth Low Energy and the traffic message is a Bluetooth Low Energy advertisement.

Lost connection component 1140 may determine that a duration since a last traffic message was received by the wireless device exceeds a time threshold, receive, via the first RAT, the traffic message indicating whether the access point includes the buffered data to be transmitted to the wireless device via the first RAT, and transmit, via the first RAT, a lost connection message to the access point indicating that the wireless device is unable to receive traffic messages via the second RAT.

Figure 12:
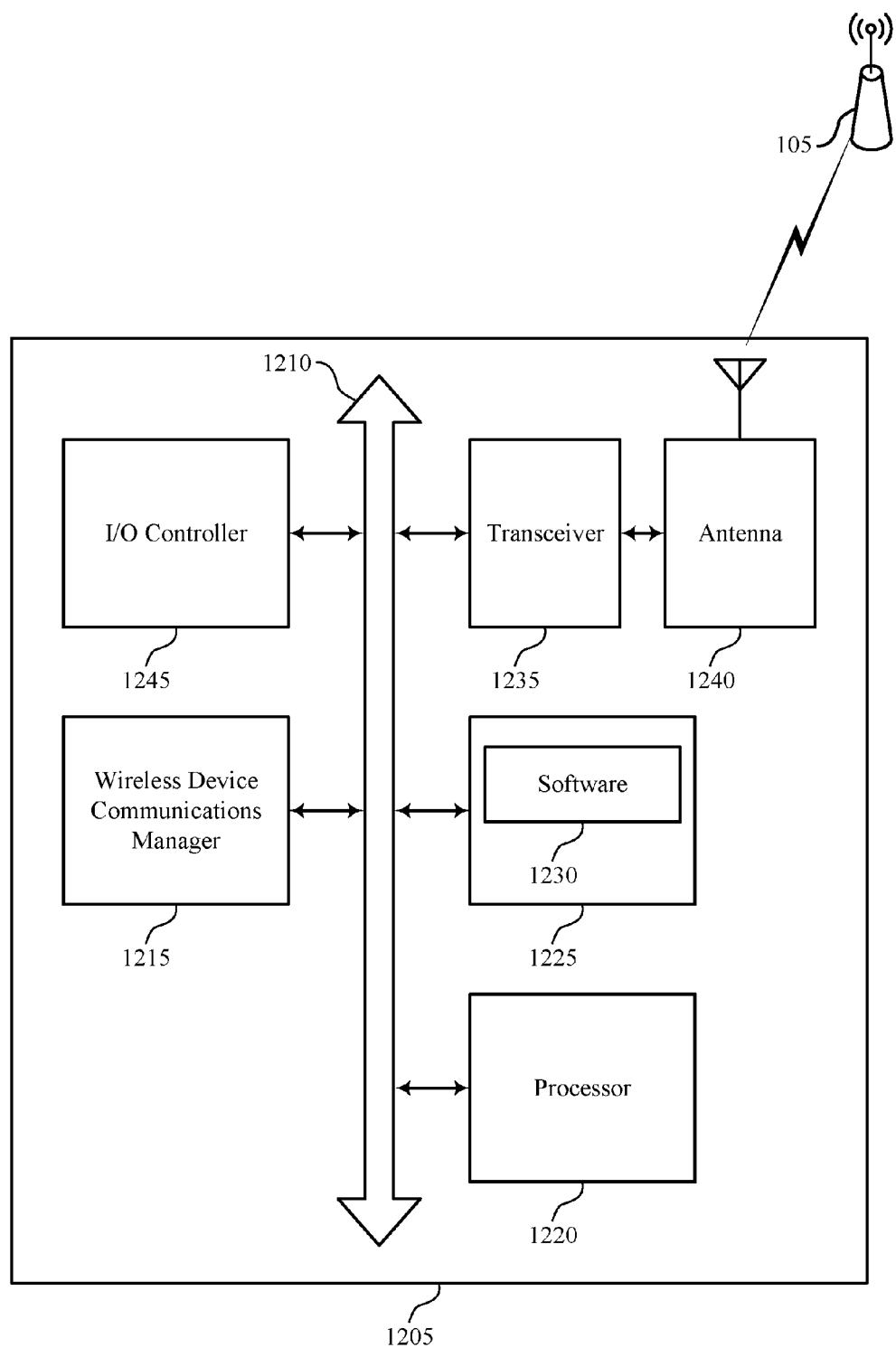
FIG. 12 illustrates a block diagram of a system including a wireless device that supports techniques to reduce power consumption in mobile device during low-power mode in accordance with aspects of the present disclosure.

FIG. 12 shows a diagram of a system 1200 including a device 1205 that supports techniques to reduce power consumption in mobile device during low-power mode in accordance with various aspects of the present disclosure. Device 1205 may be an example of or include the components of wireless device 905, wireless device 1005, or a STA 115 as described above, e.g., with reference to FIGS. 1, 2, 6, 7, 8, 9 and/or 10. Device 1205 may include components for bi-directional voice and data communications including components for transmitting and receiving communications, including wireless device communications manager 1215, processor 1220, memory 1225, software 1230, transceiver 1235, antenna 1240, and I/O controller 1245.

Processor 1220 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting techniques to reduce power consumption in mobile device during low-power mode). 1220.

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a Basic Input-Output system (BIOS) which may control basic hardware and/or software operation such as the interaction with peripheral components or devices.

Software 1230 may include code to implement aspects of the present disclosure, including code to support techniques to reduce power consumption in mobile device during low-power mode. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
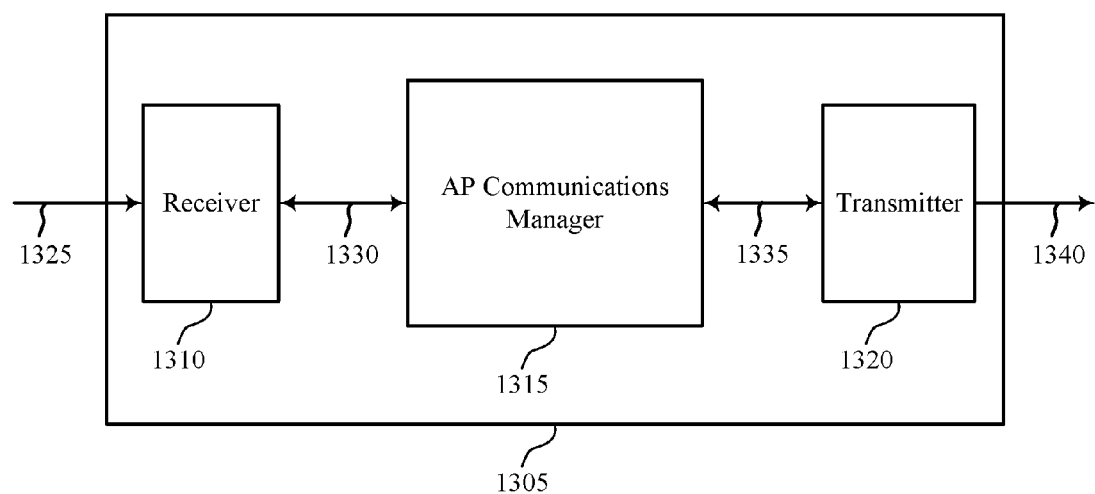
FIGS. 13 through 15 show block diagrams of a device that supports techniques to reduce power consumption in mobile device during low-power mode in accordance with aspects of the present disclosure.

FIG. 13 shows a block diagram 1300 of an access point 1305 that supports techniques to reduce power consumption in mobile device during low-power mode in accordance with various aspects of the present disclosure. Access point 1305 may be an example of aspects of a AP 105 as described with reference to FIGS. 1, 2, 6, 7, and/or 8. Access point 1305 may include receiver 1310, AP communications manager 1315, and transmitter 1320. Access point 1305 may also include a processor. Each of these components may be in communication with one another (e.g., via one or more buses).

Receiver 1310 may receive information such as packets, user data, or control information associated with various information channels (e.g., control channels, data channels, and information related to techniques to reduce power consumption in mobile device during low-power mode, etc.) via communication link 1325. Information may be passed on to other components of the device via communication link 1330. The receiver 1310 may be an example of aspects of the transceiver 1635 described with reference to FIG. 16. In some examples, the receiver 1310 may include a circuit or circuitry for receiving information over communication link 925.

AP communications manager 1315 may be an example of aspects of the AP communications manager 1615 described with reference to FIG. 16.

AP communications manager 1315 may perform a first negotiation with a wireless device using a first RAT, the first RAT associated with a first throughput level and a first power consumption level, determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level, determine that the wireless device has entered a low-power mode, and transmit, via the second RAT, a traffic message during the low-power mode of the wireless device, the traffic message indicating whether the access point includes buffered data to be transmitted to the wireless device via the first RAT.

Transmitter 1320 may transmit signals, via communication link 1340, generated by other components of the device. In some examples, the transmitter 1320 may receive those signals generated by the other components via communication link 1335. In some examples, the transmitter 1320 may be collocated with a receiver 1310 in a transceiver component. For example, the transmitter 1320 may be an example of aspects of the transceiver 1635 described with reference to FIG. 16. The transmitter 1320 may include a single antenna, or it may include a set of antennas.

Figure 14:
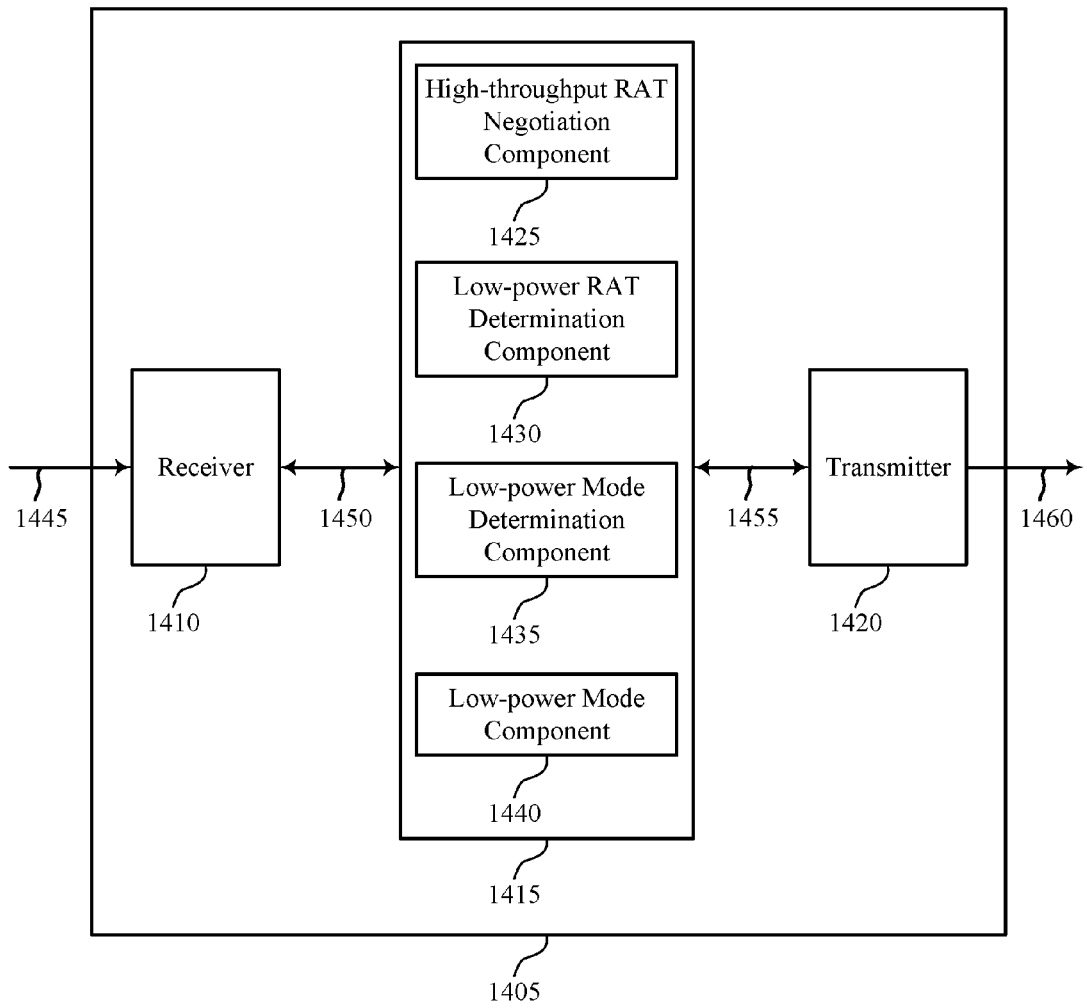

FIG. 14 shows a block diagram 1400 of an access point 1405 that supports techniques to reduce power consumption in mobile device during low-power mode in accordance with various aspects of the present disclosure. Access point 1405 may be an example of aspects of access point 1305 or AP 105 as described with reference to FIGS. 1, 2, 6, 7, 8, and/or 13. Access point 1405 may include receiver 1410, AP communications manager 1415, and transmitter 1420. Access point 1405 may also include a processor. Each of these components may be in communication with one another (e.g., via one or more buses).

Receiver 1410 may receive information such as packets, user data, or control information associated with various information channels (e.g., control channels, data channels, and information related to techniques to reduce power consumption in mobile device during low-power mode, etc.) via communication link 1445. Information may be passed on to other components of the device via communication link 1450. The receiver 1410 may be an example of aspects of the transceiver 1635 described with reference to FIG. 16. In some examples, the receiver 1410 may include a circuit or circuitry for receiving information over communication link 1445.

AP communications manager 1415 may be an example of aspects of the AP communications manager 1615 described with reference to FIG. 16.

AP communications manager 1415 may also include high-throughput RAT negotiation component 1425, low-power RAT determination component 1430, low-power mode determination component 1435, and low-power mode component 1440.

High-throughput RAT negotiation component 1425 may perform a first negotiation with a wireless device using a first RAT, the first RAT associated with a first throughput level and a first power consumption level and receive a probe message from the wireless device indicating the wireless device is capable of communicating with the access point via the first RAT and the second RAT.

Low-power RAT determination component 1430 may determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level. Low-power mode determination component 1435 may determine that the wireless device has entered a low-power mode.

Low-power mode component 1440 may transmit, via the second RAT, a traffic message during the low-power mode of the wireless device, the traffic message indicating whether the access point includes buffered data to be transmitted to the wireless device via the first RAT and transmit, via the first RAT, a sync message to the wireless device at predetermined times based on the second time interval. In some cases, the access point refrains from transmitting traffic messages via the first RAT while using the second RAT.

Transmitter 1420 may transmit signals, via communication link 1460, generated by other components of the device. In some examples, the transmitter 1420 may receive those signals generated by the other components via communication link 1455. In some examples, the transmitter 1420 may be collocated with a receiver 1410 in a transceiver component. For example, the transmitter 1420 may be an example of aspects of the transceiver 1635 described with reference to FIG. 16. The transmitter 1420 may include a single antenna, or it may include a set of antennas.

Figure 15:
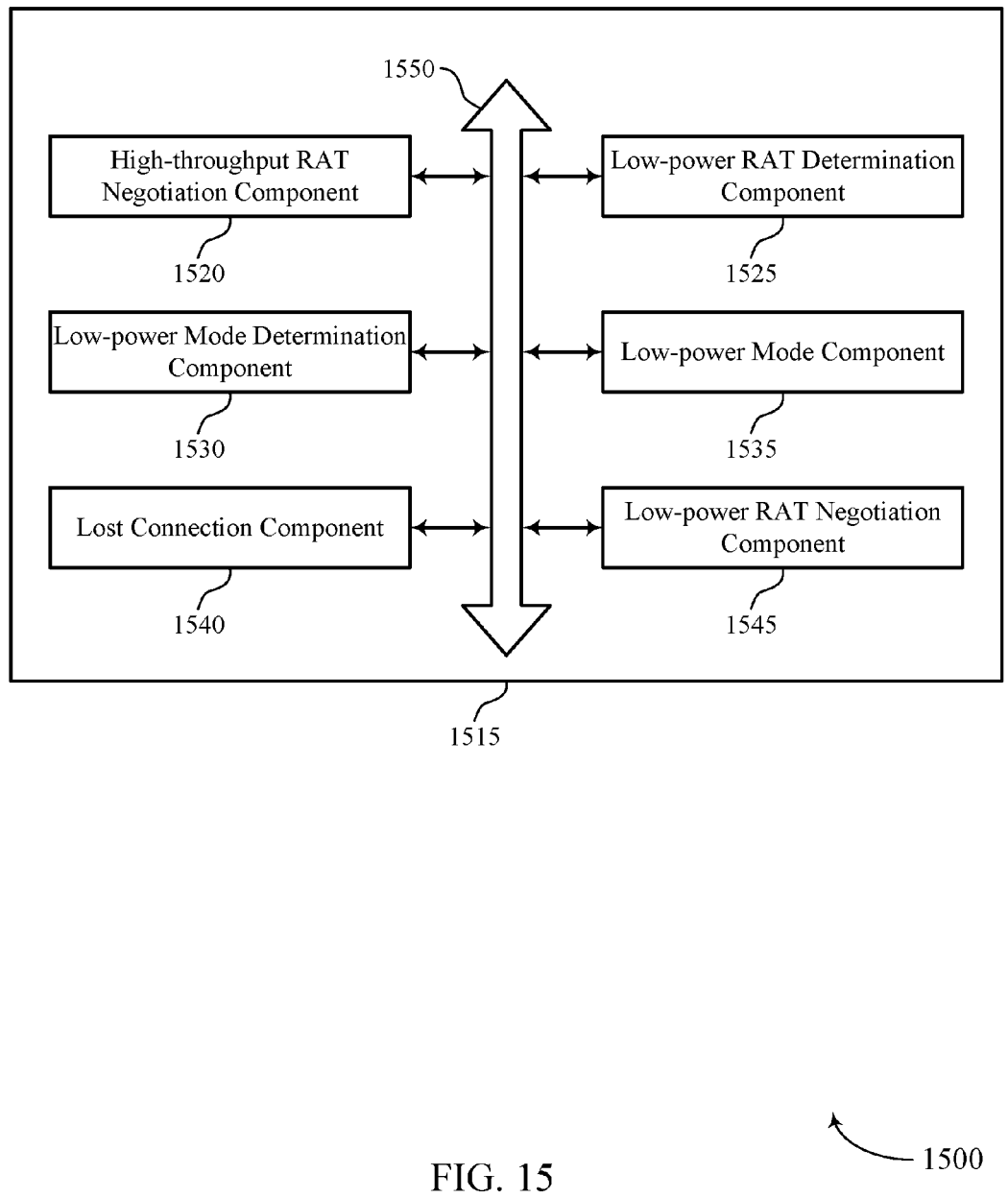

FIG. 15 shows a block diagram 1500 of an AP communications manager 1515 that supports techniques to reduce power consumption in mobile device during low-power mode in accordance with various aspects of the present disclosure. The AP communications manager 1515 may be an example of aspects of a AP communications manager 1615 described with reference to FIGS. 13, 14, and 16. The AP communications manager 1515 may include high-throughput RAT negotiation component 1520, low-power RAT determination component 1525, low-power mode determination component 1530, low-power mode component 1535, lost connection component 1540, and low-power RAT negotiation component 1545. Each of these components may communicate, directly or indirectly, with one another (e.g., via one or more buses 1550).

High-throughput RAT negotiation component 1520 may perform a first negotiation with a wireless device using a first RAT, the first RAT associated with a first throughput level and a first power consumption level and receive a probe message from the wireless device indicating the wireless device is capable of communicating with the access point via the first RAT and the second RAT.

Low-power RAT determination component 1525 may determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level. Low-power mode determination component 1530 may determine that the wireless device has entered a low-power mode.

Low-power mode component 1535 may transmit, via the second RAT, a traffic message during the low-power mode of the wireless device, the traffic message indicating whether the access point includes buffered data to be transmitted to the wireless device via the first RAT and transmit, via the first RAT, a sync message to the wireless device at predetermined times based on the second time interval. In some cases, the access point refrains from transmitting traffic messages via the first RAT while using the second RAT.

Lost connection component 1540 may receive a lost connection message from the wireless device via the first RAT, the lost connection message indicating that the wireless device is unable to receive traffic messages via the second RAT and transmit the traffic message via the first RAT during the low-power mode of the wireless device.

Low-power RAT negotiation component 1545 may perform a second negotiation with the wireless device to determine a first time interval for communicating the traffic message via the second RAT, the first time interval is based on power consumption parameters of the wireless device and determine a second time interval that is different from the first time interval, the second time interval is based on using the second RAT to communicate traffic messages.

Figure 16:
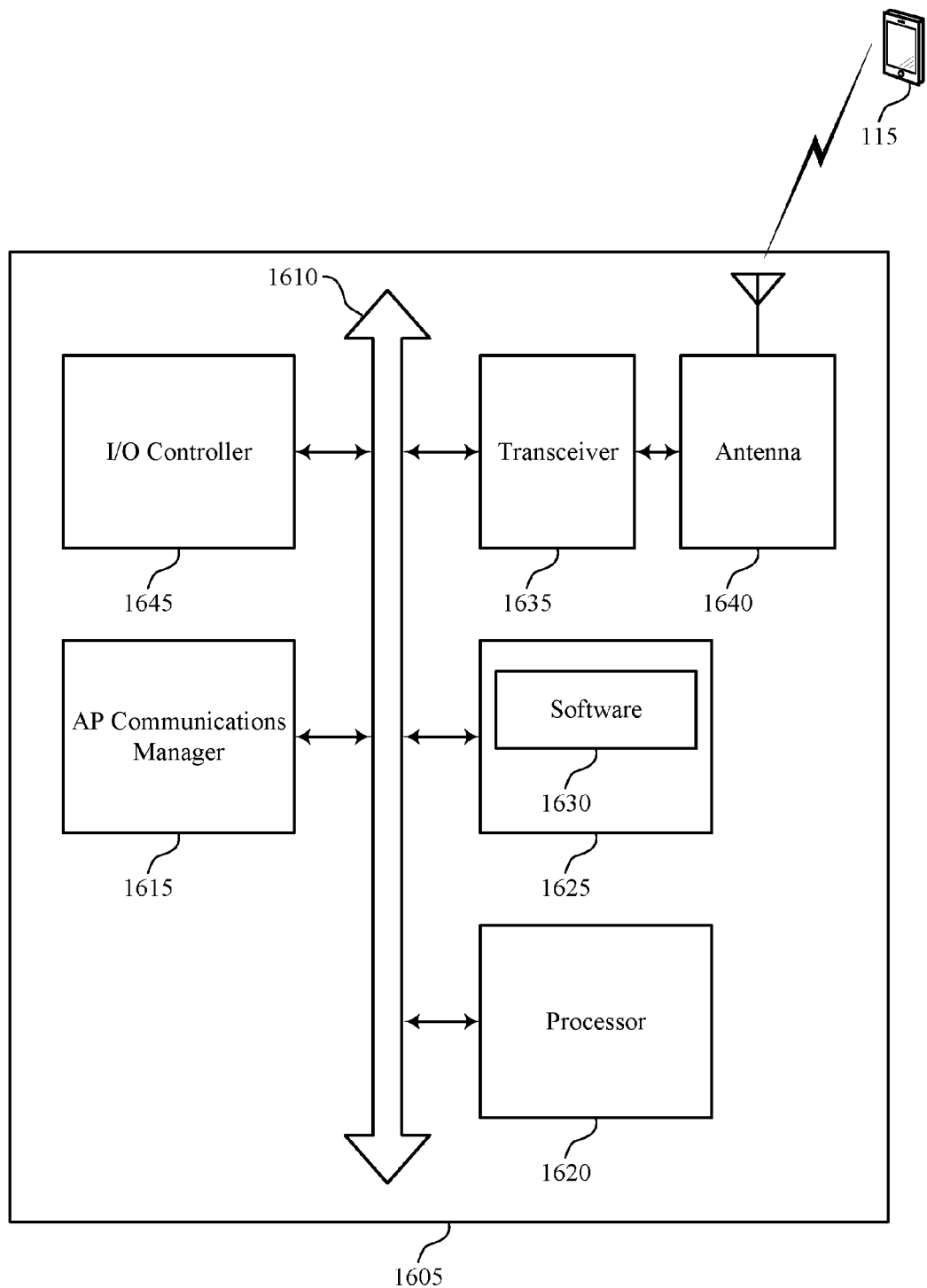
FIG. 16 illustrates a block diagram of a system including a AP that supports techniques to reduce power consumption in mobile device during low-power mode in accordance with aspects of the present disclosure.

FIG. 16 shows a diagram of a system 1600 including a device 1605 that supports techniques to reduce power consumption in mobile device during low-power mode in accordance with various aspects of the present disclosure. Device 1605 may be an example of or include the components of AP 105 as described above, e.g., with reference to FIGS. 1, 2, 6, 7, 8, 13, 14, and/or 15. Device 1605 may include components for bi-directional voice and data communications including components for transmitting and receiving communications, including AP communications manager 1615, processor 1620, memory 1625, software 1630, transceiver 1635, antenna 1640, and I/O controller 1645.

Processor 1620 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting techniques to reduce power consumption in mobile device during low-power mode). 1620.

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a Basic Input-Output system (BIOS) which may control basic hardware and/or software operation such as the interaction with peripheral components or devices.

Software 1630 may include code to implement aspects of the present disclosure, including code to support techniques to reduce power consumption in mobile device during low-power mode. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system.

In some examples, the components shown and described in FIGS. 1-2 and 9-16 may each include a circuit or circuitry to accomplish the functions described herein. For example, circuits or circuitry may be used to perform the techniques to reduce power consumption in a mobile device during a low-power mode.

Figure 17:
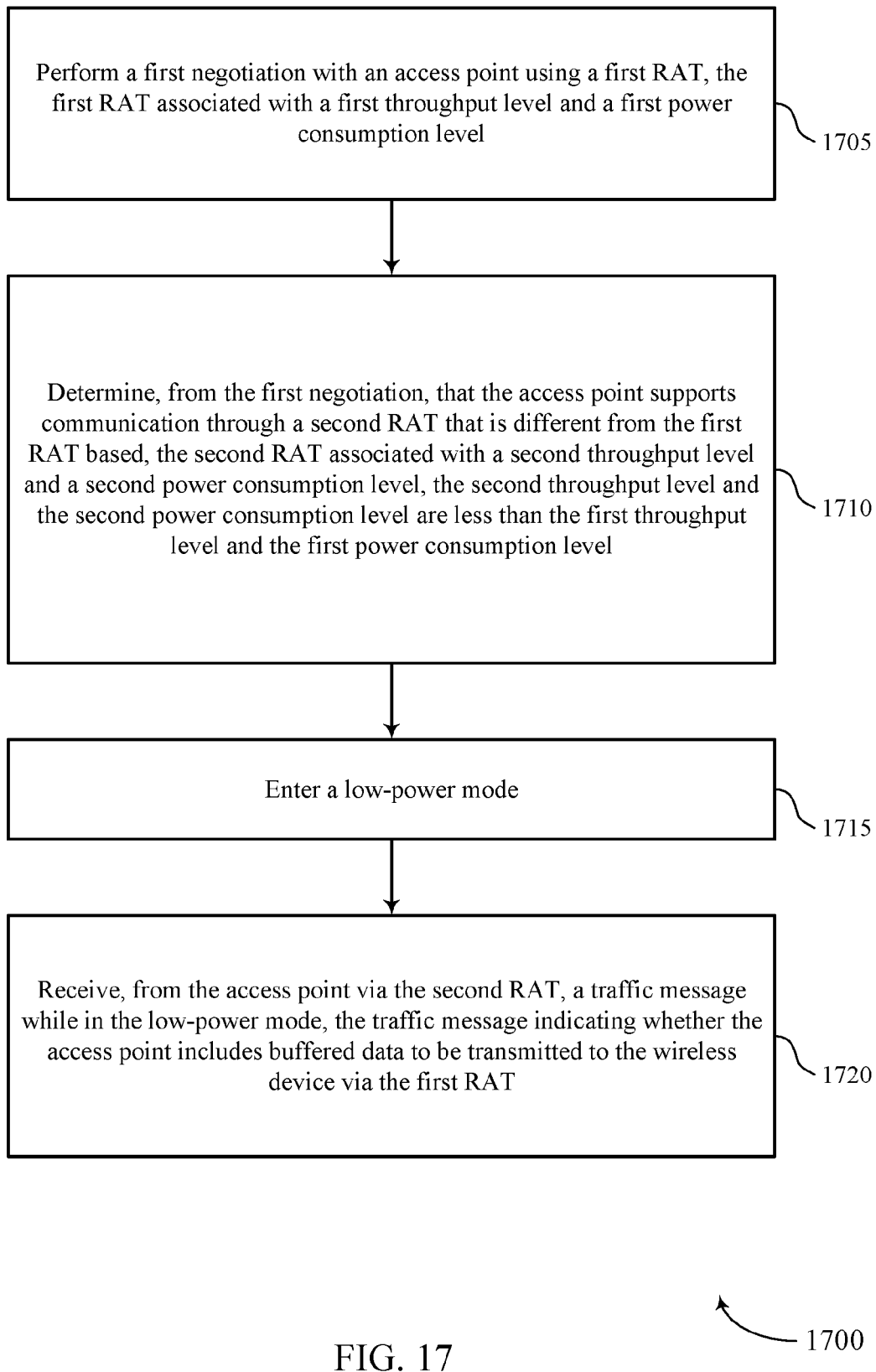
FIGS. 17 through 20 illustrate methods for techniques to reduce power consumption in mobile device during low-power mode in accordance with aspects of the present disclosure.

FIG. 17 shows a flowchart illustrating a method 1700 for techniques to reduce power consumption in mobile device during low-power mode in accordance with various aspects of the present disclosure. The operations of method 1700 may be implemented by a STA (or wireless device) 115 or its components as described herein. For example, the operations of method 1700 may be performed by a wireless device communications manager as described with reference to FIGS. 9 through 12. In some examples, a wireless device 115 may execute a set of codes to control the functional elements of the device to perform the functions described below. Additionally or alternatively, the wireless device 115 may perform aspects the functions described below using special-purpose hardware.

At block 1705 the wireless device 115 may perform a first negotiation with an access point using a first radio access technology (RAT), the first RAT associated with a first throughput level and a first power consumption level. The operations of block 1705 may be performed according to the methods described with reference to FIGS. 1 through 8. In certain examples, aspects of the operations of block 1705 may be performed by a high-throughput RAT negotiation component as described with reference to FIGS. 9 through 12.

At block 1710 the wireless device 115 may determine, from the first negotiation, that the access point supports communication through a second RAT that is different from the first RAT based, the second RAT associated with a second throughput level and a second power consumption level, the second throughput level and the second power consumption level are less than the first throughput level and the first power consumption level. The operations of block 1710 may be performed according to the methods described with reference to FIGS. 1 through 8. In certain examples, aspects of the operations of block 1710 may be performed by a low-power RAT determination component as described with reference to FIGS. 9 through 12.

At block 1715 the wireless device 115 may enter a low-power mode. The operations of block 1715 may be performed according to the methods described with reference to FIGS. 1 through 8. In certain examples, aspects of the operations of block 1715 may be performed by a low-power mode component as described with reference to FIGS. 9 through 12.

At block 1720 the wireless device 115 may receive, from the access point via the second RAT, a traffic message while in the low-power mode, the traffic message indicating whether the access point comprises buffered data to be transmitted to the wireless device via the first RAT. The operations of block 1720 may be performed according to the methods described with reference to FIGS. 1 through 8. In certain examples, aspects of the operations of block 1720 may be performed by a low-power mode component as described with reference to FIGS. 9 through 12.

Figure 18:
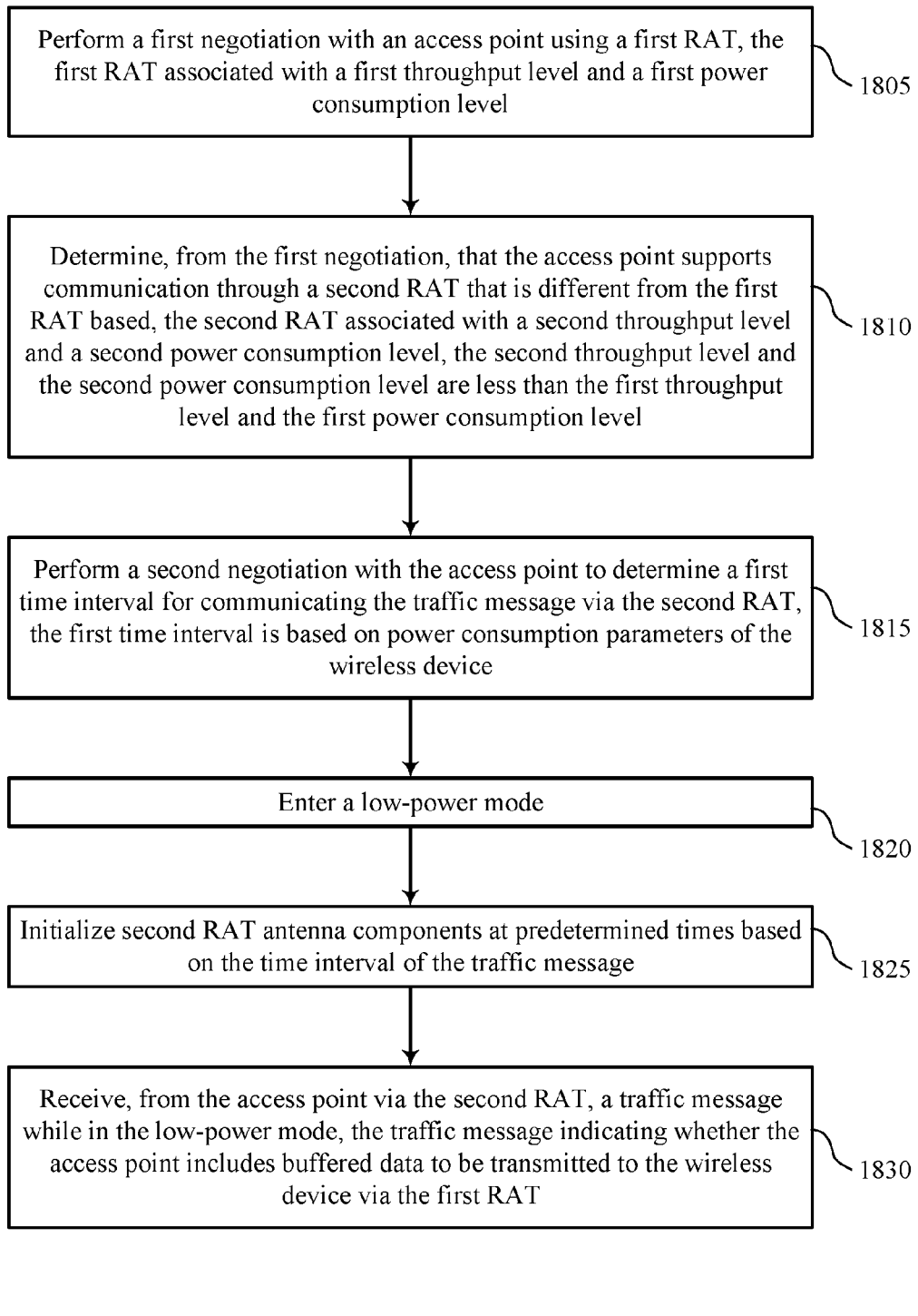

FIG. 18 shows a flowchart illustrating a method 1800 for techniques to reduce power consumption in mobile device during low-power mode in accordance with various aspects of the present disclosure. The operations of method 1800 may be implemented by a STA (or wireless device) 115 or its components as described herein. For example, the operations of method 1800 may be performed by a wireless device communications manager as described with reference to FIGS. 9 through 12. In some examples, a wireless device 115 may execute a set of codes to control the functional elements of the device to perform the functions described below. Additionally or alternatively, the wireless device 115 may perform aspects the functions described below using special-purpose hardware.

At block 1805 the wireless device 115 may perform a first negotiation with an access point using a first radio access technology (RAT), the first RAT associated with a first throughput level and a first power consumption level. The operations of block 1805 may be performed according to the methods described with reference to FIGS. 1 through 8. In certain examples, aspects of the operations of block 1805 may be performed by a high-throughput RAT negotiation component as described with reference to FIGS. 9 through 12.

At block 1810 the wireless device 115 may determine, from the first negotiation, that the access point supports communication through a second RAT that is different from the first RAT based, the second RAT associated with a second throughput level and a second power consumption level, the second throughput level and the second power consumption level are less than the first throughput level and the first power consumption level. The operations of block 1810 may be performed according to the methods described with reference to FIGS. 1 through 8. In certain examples, aspects of the operations of block 1810 may be performed by a low-power RAT determination component as described with reference to FIGS. 9 through 12.

At block 1815 the wireless device 115 may perform a second negotiation with the access point to determine a first time interval for communicating the traffic message via the second RAT, the first time interval is based at least in part on power consumption parameters of the wireless device. The operations of block 1815 may be performed according to the methods described with reference to FIGS. 1 through 8. In certain examples, aspects of the operations of block 1815 may be performed by a low-power RAT negotiation component as described with reference to FIGS. 9 through 12.

At block 1820 the wireless device 115 may enter a low-power mode. The operations of block 1820 may be performed according to the methods described with reference to FIGS. 1 through 8. In certain examples, aspects of the operations of block 1820 may be performed by a low-power mode component as described with reference to FIGS. 9 through 12.

At block 1825 the wireless device 115 may initialize second RAT antenna components at predetermined times based at least in part on the time interval of the traffic message. The operations of block 1825 may be performed according to the methods described with reference to FIGS. 1 through 8. In certain examples, aspects of the operations of block 1825 may be performed by a low-power mode component as described with reference to FIGS. 9 through 12.

At block 1830 the wireless device 115 may receive, from the access point via the second RAT, a traffic message while in the low-power mode, the traffic message indicating whether the access point comprises buffered data to be transmitted to the wireless device via the first RAT. In some examples, receiving traffic message from the access point may be done using the second RAT antenna components. The operations of block 1830 may be performed according to the methods described with reference to FIGS. 1 through 8. In certain examples, aspects of the operations of block 1830 may be performed by a low-power mode component as described with reference to FIGS. 9 through 12.

Figure 19:
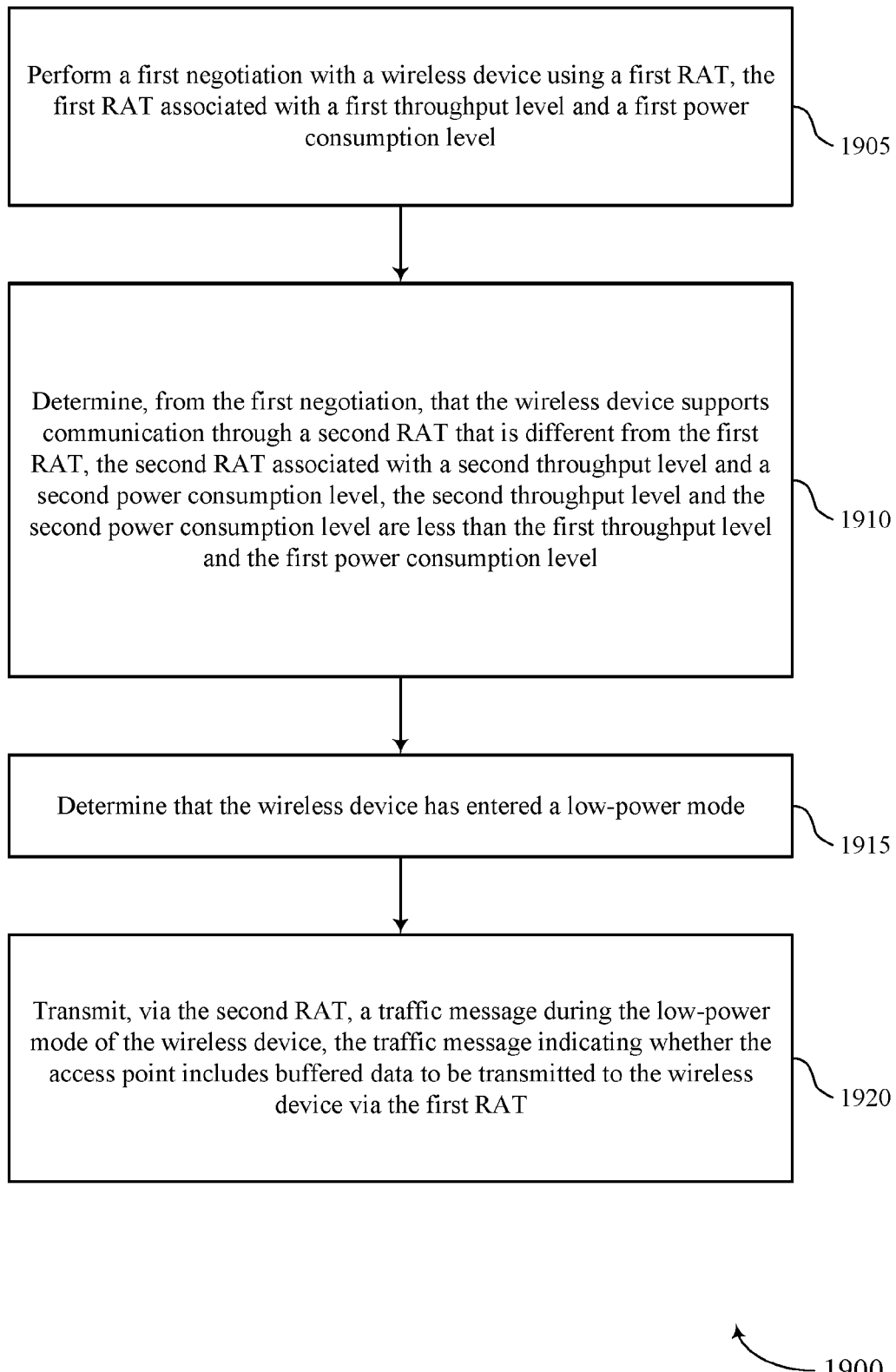

FIG. 19 shows a flowchart illustrating a method 1900 for techniques to reduce power consumption in mobile device during low-power mode in accordance with various aspects of the present disclosure. The operations of method 1900 may be implemented by a AP 105 or its components as described herein. For example, the operations of method 1900 may be performed by a AP communications manager as described with reference to FIGS. 13 through 16. In some examples, a AP 105 may execute a set of codes to control the functional elements of the device to perform the functions described below. Additionally or alternatively, the AP 105 may perform aspects the functions described below using special-purpose hardware.

At block 1905 the AP 105 may perform a first negotiation with a wireless device using a first radio access technology (RAT), the first RAT associated with a first throughput level and a first power consumption level. The operations of block 1905 may be performed according to the methods described with reference to FIGS. 1 through 8. In certain examples, aspects of the operations of block 1905 may be performed by a high-throughput RAT negotiation component as described with reference to FIGS. 13 through 16.

At block 1910 the AP 105 may determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level. The operations of block 1910 may be performed according to the methods described with reference to FIGS. 1 through 8. In certain examples, aspects of the operations of block 1910 may be performed by a low-power RAT determination component as described with reference to FIGS. 13 through 16.

At block 1915 the AP 105 may determine that the wireless device has entered a low-power mode. The operations of block 1915 may be performed according to the methods described with reference to FIGS. 1 through 8. In certain examples, aspects of the operations of block 1915 may be performed by a low-power mode determination component as described with reference to FIGS. 13 through 16.

At block 1920 the AP 105 may transmit, via the second RAT, a traffic message during the low-power mode of the wireless device, the traffic message indicating whether the access point comprises buffered data to be transmitted to the wireless device via the first RAT. The operations of block 1920 may be performed according to the methods described with reference to FIGS. 1 through 8. In certain examples, aspects of the operations of block 1920 may be performed by a low-power mode component as described with reference to FIGS. 13 through 16.

Figure 20:
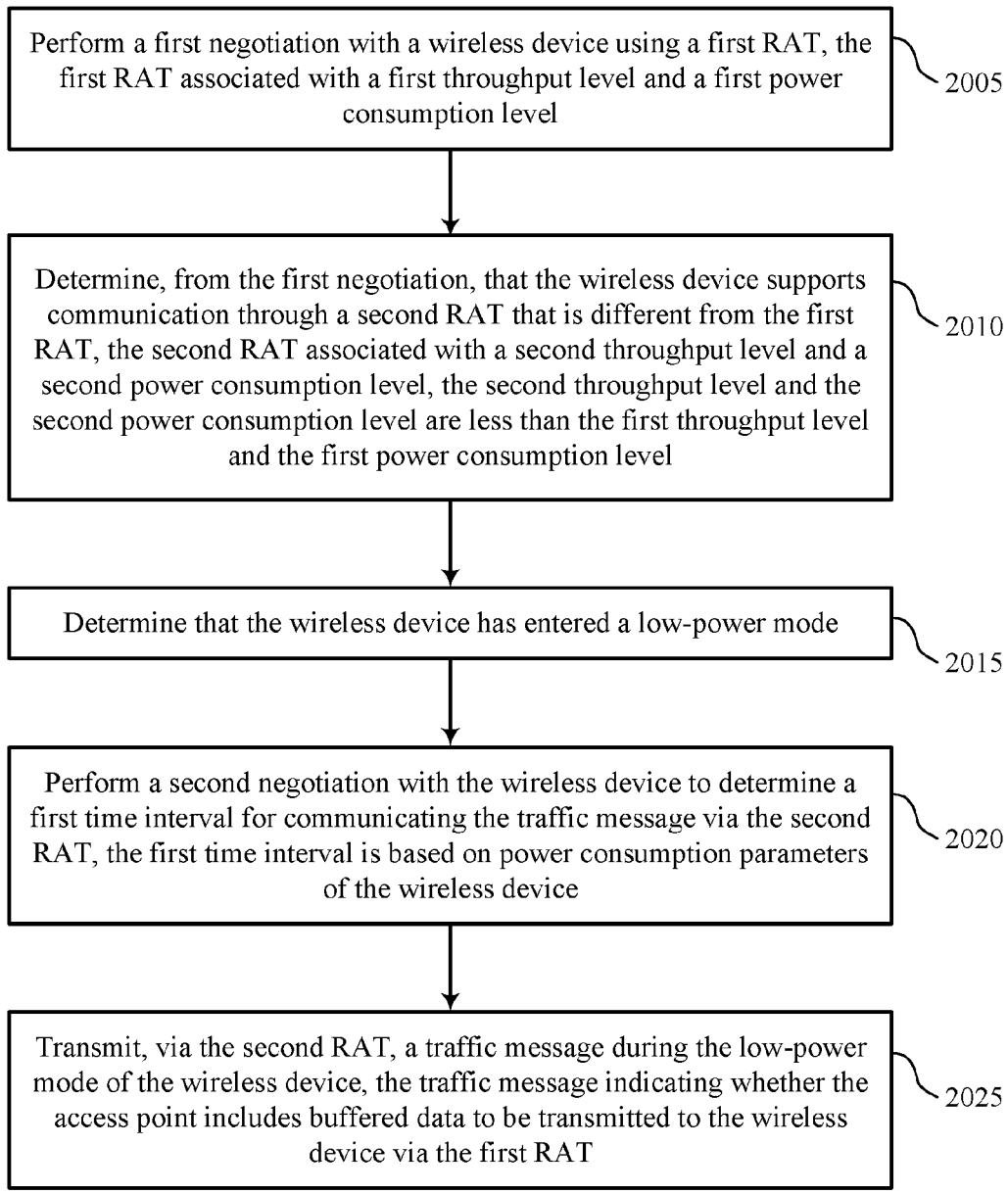

FIG. 20 shows a flowchart illustrating a method 2000 for techniques to reduce power consumption in mobile device during low-power mode in accordance with various aspects of the present disclosure. The operations of method 2000 may be implemented by a AP 105 or its components as described herein. For example, the operations of method 2000 may be performed by a AP communications manager as described with reference to FIGS. 13 through 16. In some examples, a AP 105 may execute a set of codes to control the functional elements of the device to perform the functions described below. Additionally or alternatively, the AP 105 may perform aspects the functions described below using special-purpose hardware.

At block 2005 the AP 105 may perform a first negotiation with a wireless device using a first radio access technology (RAT), the first RAT associated with a first throughput level and a first power consumption level. The operations of block 2005 may be performed according to the methods described with reference to FIGS. 1 through 8. In certain examples, aspects of the operations of block 2005 may be performed by a high-throughput RAT negotiation component as described with reference to FIGS. 13 through 16.

At block 2010 the AP 105 may determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level. The operations of block 2010 may be performed according to the methods described with reference to FIGS. 1 through 8. In certain examples, aspects of the operations of block 2010 may be performed by a low-power RAT determination component as described with reference to FIGS. 13 through 16.

At block 2015 the AP 105 may determine that the wireless device has entered a low-power mode. The operations of block 2015 may be performed according to the methods described with reference to FIGS. 1 through 8. In certain examples, aspects of the operations of block 2015 may be performed by a low-power mode determination component as described with reference to FIGS. 13 through 16.

At block 2020 the AP 105 may perform a second negotiation with the wireless device to determine a first time interval for communicating the traffic message via the second RAT, the first time interval is based at least in part on power consumption parameters of the wireless device. The operations of block 2020 may be performed according to the methods described with reference to FIGS. 1 through 8. In certain examples, aspects of the operations of block 2020 may be performed by a low-power RAT negotiation component as described with reference to FIGS. 13 through 16.

At block 2025 the AP 105 may transmit, via the second RAT, a traffic message during the low-power mode of the wireless device, the traffic message indicating whether the access point comprises buffered data to be transmitted to the wireless device via the first RAT. The operations of block 2025 may be performed according to the methods described with reference to FIGS. 1 through 8. In certain examples, aspects of the operations of block 2025 may be performed by a low-power mode component as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

As used herein, the phrase "based on" shall not be construed as a reference to a closed set of conditions. For example, an exemplary step that is described as "based on condition A" may be based on both condition A and a condition B without departing from the scope of the present disclosure. In other words, as used herein, the phrase "based on" shall be construed in the same manner as the phrase "based at least in part on."

What is claimed is:

1. An apparatus for communicating using a wireless device, in a system comprising:
   a processor;
   memory in electronic communication with the processor; and
   instructions stored in the memory and operable, when executed by the processor, to cause the apparatus to:
   perform a first negotiation with an access point using a first radio access technology (RAT), the first RAT associated with a first throughput level and a first power consumption level;
   determine, from the first negotiation, that the access point supports communication through a second RAT that is different from the first RAT, the second RAT associated with a second throughput level and a second power consumption level, the second throughput level and the second power consumption level are less than the first throughput level and the first power consumption level;
   perform a second negotiation with the access point to determine a first time interval for communicating the traffic message via the second RAT, wherein the first time interval is based at least in part on power consumption parameters of the wireless device;
   enter a low-power mode; and
   receive, from the access point via the second RAT, a traffic message while in the low-power mode, the traffic message indicating whether the access point comprises buffered data to be transmitted to the wireless device via the first RAT.

2. The apparatus of claim 1, wherein the instructions are further executable by the processor to:
   initialize first RAT antenna components based at least in part on receiving the traffic message; and
   receive, via the first RAT, the buffered data from the access point using the first RAT antenna components.

3. The apparatus of claim 1, wherein the instructions are further executable by the processor to:
   determine a second time interval that is different from the first time interval, the second time interval is based at least in part on using the second RAT to communicate traffic messages;
   initialize first RAT antenna components at predetermined times based at least in part on the second time interval; and
   receive, from the access point via the first RAT, a sync message at predetermined times according to the second time interval.

4. The apparatus of claim 1, wherein to receive the traffic message further comprises instructions to cause the apparatus to:
   initialize second RAT antenna components at predetermined times based at least in part on the first time interval of the traffic message; and
   the instructions are further executable to receive, via the second RAT, the traffic message from the access point using the second RAT antenna components.

5. The apparatus of claim 1, wherein to determine the access point supports communication via the second RAT further comprises instructions to cause the apparatus to:
   receive, from the access point via the first RAT, an first indication that the access point is capable of communicating via the second RAT; and
   the instructions are further executable to transmit, to the access point via the first RAT, a second indication that the wireless device is also capable of communicating via the second RAT.

6. The apparatus of claim 1, wherein performing the first negotiation comprises instructions to cause the apparatus to:
receive a message from the access point in response to a probe transmitted by the wireless device, the message indicating that the access point may communicate via the first RAT and the second RAT.

7. The apparatus of claim 1, wherein the instructions are further executable by the processor to:
determine that a duration since a last traffic message was received by the wireless device exceeds a time threshold; and
receive, via the first RAT, the traffic message indicating whether the access point comprises the buffered data to be transmitted to the wireless device via the first RAT.

8. The apparatus of claim 7, wherein the instructions are further executable by the processor to:
transmit, via the first RAT, a lost connection message to the access point indicating that the wireless device is unable to receive traffic messages via the second RAT.

9. The apparatus of claim 1, wherein
the first RAT is a wireless local area network that uses the 802.11 standard to communicate messages.

10. The apparatus of claim 1, wherein
the first RAT is a network that uses the Wi-Gig standard to communicate messages.

11. The apparatus of claim 1, wherein
the second RAT is a network that uses a Bluetooth Low Energy standard to communicate messages and the traffic message is a Bluetooth Low Energy advertisement.

12. An apparatus for communicating using an access point, in a system comprising:
a processor;
memory in electronic communication with the processor; and
instructions stored in the memory and operable, when executed by the processor, to cause the apparatus to:
perform a first negotiation with a wireless device using a first radio access technology (RAT), the first RAT associated with a first throughput level and a first power consumption level;
determine, from the first negotiation, that the wireless device supports communication through a second RAT that is different from the first RAT, the second RAT associated with a second throughput level and a second power consumption level, the second throughput level and the second power consumption level are less than the first throughput level and the first power consumption level;
perform a second negotiation with the wireless device to determine a first time interval for communicating the traffic message via the second RAT, wherein the first time interval is based at least in part on power consumption parameters of the wireless device;
determine that the wireless device has entered a low-power mode; and
transmit, via the second RAT, a traffic message during the low-power mode of the wireless device, the traffic message indicating whether the access point comprises buffered data to be transmitted to the wireless device via the first RAT.

13. The apparatus of claim 12, wherein the instructions are further executable by the processor to:
receive a lost connection message from the wireless device via the first RAT, the lost connection message indicating that the wireless device is unable to receive traffic messages via the second RAT; and
transmit the traffic message via the first RAT during the low-power mode of the wireless device.

14. The apparatus of claim 12, wherein the instructions are further executable by the processor to:
receive a probe message from the wireless device indicating the wireless device is capable of communicating with the access point via the first RAT and the second RAT.

15. The apparatus of claim 12, wherein the instructions are further executable by the processor to:
determine a second time interval that is different from the first time interval, the second time interval is based at least in part on using the second RAT to communicate traffic messages; and
transmit, via the first RAT, a sync message to the wireless device at predetermined times based at least in part on the second time interval.

16. The apparatus of claim 12, wherein:
the access point refrains from transmitting traffic messages via the first RAT while using the second RAT.

17. A method of communicating using a wireless device, comprising:
performing a first negotiation with an access point using a first radio access technology (RAT), the first RAT associated with a first throughput level and a first power consumption level;
determining, from the first negotiation, that the access point supports communication through a second RAT that is different from the first RAT based, the second RAT associated with a second throughput level and a second power consumption level, the second throughput level and the second power consumption level are less than the first throughput level and the first power consumption level;
performing a second negotiation with the access point to determine a first time interval for communicating the traffic message via the second RAT, wherein the first time interval is based at least in part on power consumption parameters of the wireless device;
entering a low-power mode; and
receiving, from the access point via the second RAT, a traffic message while in the low-power mode, the traffic message indicating whether the access point comprises buffered data to be transmitted to the wireless device via the first RAT.

18. The method of claim 17, further comprising:
initializing first RAT antenna components based at least in part on receiving the traffic message; and
receiving, via the first RAT, the buffered data from the access point using the first RAT antenna components.

19. The method of claim 17, further comprising:
determining a second time interval that is different from the first time interval, the second time interval is based at least in part on using the second RAT to communicate traffic messages;
initializing first RAT antenna components at predetermined times based at least in part on the second time interval; and
receiving, from the access point via the first RAT, a sync message at predetermined times according to the second time interval.

20. The method of claim 17, wherein receiving the traffic message further comprises:
initializing second RAT antenna components at predetermined times based at least in part on the time interval of the traffic message; and the method further comprising receiving, via the second RAT, the traffic message from the access point using the second RAT antenna components.

21. The method of claim 17, wherein determining the access point supports communication via the second RAT further comprises:
receiving, from the access point via the first RAT, an first indication that the access point is capable of communicating via the second RAT; and
the method further comprising transmitting, to the access point via the first RAT, a second indication that the wireless device is also capable of communicating via the second RAT.

22. The method of claim 17, wherein performing the first negotiation comprises:
receiving a message from the access point in response to a probe transmitted by the wireless device, the message indicating that the access point may communicate via the first RAT and the second RAT.

23. A method of communicating using an access point, comprising:
performing a first negotiation with a wireless device using a first radio access technology (RAT), the first RAT associated with a first throughput level and a first power consumption level;
determining, from the first negotiation, that the wireless device supports communication through a second RAT that is different from the first RAT, the second RAT associated with a second throughput level and a second power consumption level, the second throughput level and the second power consumption level are less than the first throughput level and the first power consumption level;
performing a second negotiation with the wireless device to determine a first time interval for communicating the traffic message via the second RAT, wherein the first time interval is based at least in part on power consumption parameters of the wireless device;
determining that the wireless device has entered a low-power mode; and
transmitting, via the second RAT, a traffic message during the low-power mode of the wireless device, the traffic message indicating whether the access point comprises buffered data to be transmitted to the wireless device via the first RAT.

24. The method of claim 23, further comprising:
receiving a lost connection message from the wireless device via the first RAT, the lost connection message indicating that the wireless device is unable to receive traffic messages via the second RAT; and
transmitting the traffic message via the first RAT during the low-power mode of the wireless device.

25. The method of claim 23, further comprising:
determining a second time interval that is different from the first time interval, the second time interval is based at least in part on using the second RAT to communicate traffic messages; and
transmitting, via the first RAT, a sync message to the wireless device at predetermined times based at least in part on the second time interval.

26. The method of claim 23, wherein:
the access point refrains from transmitting traffic messages via the first RAT while using the second RAT.

* * * * *